United States Patent
Goudy et al.

(10) Patent No.: US 9,725,037 B2
(45) Date of Patent: Aug. 8, 2017

(54) MESSAGE OCCLUSION DETECTION SYSTEM AND METHOD IN A VEHICLE-TO-VEHICLE COMMUNICATION NETWORK

(71) Applicant: Nissan North America, Inc., Franklin, TN (US)

(72) Inventors: Roy Goudy, Farmington Hills, MI (US); Neal Probert, Farmington Hills, MI (US); Jeremy Chambers, Casco, MI (US); Andrew Christensen, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 74 days.

(21) Appl. No.: 14/795,286

(22) Filed: Jul. 9, 2015

(65) Prior Publication Data
US 2017/0008455 A1 Jan. 12, 2017

(51) Int. Cl.
*G08G 1/16* (2006.01)
*B60Q 9/00* (2006.01)
(Continued)

(52) U.S. Cl.
CPC ........... *B60Q 9/008* (2013.01); *G08G 1/0112* (2013.01); *G08G 1/096741* (2013.01);
(Continued)

(58) Field of Classification Search
CPC ....... G08G 1/096783; G08G 1/096741; G08G 1/0112; G08G 1/096791; G08G 1/163; B60Q 9/008
See application file for complete search history.

(56) References Cited

U.S. PATENT DOCUMENTS

| | | | | |
|---|---|---|---|---|
| 4,667,334 A | * | 5/1987 | Collec | H03G 3/3068 375/365 |
| 5,640,323 A | * | 6/1997 | Kleimenhagen | B60K 31/0008 701/1 |

(Continued)

FOREIGN PATENT DOCUMENTS

| | | |
|---|---|---|
| JP | 2001118199 A | 4/2001 |
| JP | 2003051099 A | 2/2003 |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Joseph Feild
*Assistant Examiner* — Rufus Point
(74) *Attorney, Agent, or Firm* — Young Basile Hanlon & MacFarlane, P.C.

(57) ABSTRACT

A method for providing information to a driver of a vehicle includes receiving, at a host vehicle via a wireless electronic communication link, messages that each include remote vehicle information for a respective one of the one or more remote vehicles; identifying host vehicle information for the host vehicle; determining that a potential message occlusion exists based at least in part on the remote vehicle information for the one or more remote vehicles and the host vehicle information; and in response to determining that a potential message occlusion exists, causing a message occlusion alert to be output.

18 Claims, 17 Drawing Sheets

(51) Int. Cl.
  *G08G 1/0967* (2006.01)
  *G08G 1/01* (2006.01)
(52) U.S. Cl.
  CPC . *G08G 1/096783* (2013.01); *G08G 1/096791* (2013.01); *G08G 1/163* (2013.01)

(56) References Cited

U.S. PATENT DOCUMENTS

| | | | |
|---|---|---|---|
| 5,939,976 A | 8/1999 | Sasaki et al. | |
| 5,940,010 A | 8/1999 | Sasaki et al. | |
| 6,008,741 A | 12/1999 | Shinagawa et al. | |
| 6,049,269 A * | 4/2000 | Byrd | B60R 25/04 307/10.2 |
| 6,236,337 B1 * | 5/2001 | Beier | H04B 7/26 340/426.16 |
| 6,289,332 B2 * | 9/2001 | Menig | B60K 35/00 180/167 |
| 6,529,831 B1 | 3/2003 | Smith et al. | |
| 6,567,035 B1 * | 5/2003 | Elliott | G01S 7/022 342/20 |
| 6,603,406 B2 * | 8/2003 | Jambhekar | G08G 1/01 340/905 |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,759,942 B2 * | 7/2004 | Bedi | B60R 16/0231 340/436 |
| 6,791,471 B2 | 9/2004 | Wehner et al. | |
| 6,810,328 B2 | 10/2004 | Yokota et al. | |
| 6,985,089 B2 * | 1/2006 | Liu | G08G 1/161 340/436 |
| 7,188,026 B2 * | 3/2007 | Tzamaloukas | G01C 21/28 340/993 |
| 7,190,260 B2 * | 3/2007 | Rast | G08G 1/162 340/467 |
| 7,295,925 B2 * | 11/2007 | Breed | B60N 2/2863 340/436 |
| 7,418,346 B2 * | 8/2008 | Breed | B60N 2/2863 701/117 |
| 7,835,396 B2 * | 11/2010 | Nagura | H04L 1/1657 370/468 |
| 7,991,551 B2 * | 8/2011 | Samuel | G08G 1/162 340/901 |
| 7,994,902 B2 * | 8/2011 | Avery | G08G 1/161 340/435 |
| 8,000,897 B2 | 8/2011 | Breed et al. | |
| 8,169,338 B2 * | 5/2012 | Mudalige | G08G 1/163 340/438 |
| 8,175,796 B1 | 5/2012 | Blackburn et al. | |
| 8,229,350 B2 * | 7/2012 | Smith, Jr. | B61L 15/0027 246/167 R |
| 8,229,663 B2 * | 7/2012 | Zeng | B60W 40/02 180/168 |
| 8,314,718 B2 * | 11/2012 | Muthaiah | H04L 47/10 340/426.24 |
| 8,340,894 B2 | 12/2012 | Yester | |
| 8,451,732 B2 * | 5/2013 | Nagura | H04L 1/1657 370/235 |
| 8,466,807 B2 | 6/2013 | Mudalige | |
| 8,499,155 B2 * | 7/2013 | Kherani | H04L 1/0041 713/168 |
| 8,520,695 B1 * | 8/2013 | Rubin | G08G 9/02 370/337 |
| 8,548,729 B2 | 10/2013 | Mizuguchi | |
| 8,577,550 B2 | 11/2013 | Lu et al. | |
| 8,587,418 B2 * | 11/2013 | Mochizuki | B60Q 9/008 340/435 |
| 8,639,426 B2 | 1/2014 | Dedes et al. | |
| 8,648,709 B2 * | 2/2014 | Gauger | F16P 3/14 340/539.1 |
| 8,675,603 B2 * | 3/2014 | Lee | H04W 36/08 370/331 |
| 8,717,192 B2 * | 5/2014 | Durekovic | G08G 1/161 340/903 |
| 8,848,608 B1 * | 9/2014 | Addepalli | H04W 4/046 370/328 |
| 8,948,044 B2 * | 2/2015 | Bansal | H04W 28/021 370/253 |
| 9,173,156 B2 * | 10/2015 | Bai | H04W 40/28 |
| 9,214,086 B1 * | 12/2015 | Onishi | G08G 1/096791 |
| 9,227,595 B2 * | 1/2016 | Yang | B60R 25/102 |
| 9,229,088 B2 * | 1/2016 | Cheng | G01S 5/0072 |
| 9,241,249 B2 * | 1/2016 | Yang | H04W 4/22 |
| 9,251,630 B2 * | 2/2016 | Denny | B60W 30/09 |
| 9,297,891 B2 * | 3/2016 | Karl | G01S 7/539 |
| 9,297,892 B2 | 3/2016 | Smith et al. | |
| 9,392,486 B2 * | 7/2016 | Bai | H04W 4/027 |
| 9,449,515 B2 * | 9/2016 | Rubin | G08G 9/02 |
| 2001/0044697 A1 | 11/2001 | Kageyama | B60W 40/04 701/301 |
| 2002/0198632 A1 * | 12/2002 | Breed | B60N 2/2863 701/1 |
| 2005/0134440 A1 | 6/2005 | Breed | |
| 2006/0015231 A1 * | 1/2006 | Yoshimura | B60K 6/46 701/48 |
| 2006/0052909 A1 | 3/2006 | Cherouny | |
| 2007/0050130 A1 | 3/2007 | Grimm et al. | |
| 2007/0109111 A1 | 5/2007 | Breed et al. | |
| 2007/0262881 A1 | 11/2007 | Taylor | |
| 2008/0037577 A1 * | 2/2008 | Nagura | H04L 1/1657 370/445 |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0019891 A1 * | 1/2010 | Mudalige | G08G 1/163 340/425.5 |
| 2010/0094509 A1 | 4/2010 | Luke et al. | |
| 2010/0169009 A1 | 7/2010 | Breed et al. | |
| 2010/0198513 A1 * | 8/2010 | Zeng | B60W 40/02 701/300 |
| 2010/0248618 A1 * | 9/2010 | Bai | H04L 12/1818 455/11.1 |
| 2011/0080302 A1 * | 4/2011 | Muthaiah | H04L 47/10 340/903 |
| 2011/0087433 A1 * | 4/2011 | Yester | G08G 1/163 701/301 |
| 2011/0128902 A1 * | 6/2011 | Guo | G08G 1/161 370/312 |
| 2011/0238259 A1 * | 9/2011 | Bai | H04L 67/125 701/31.4 |
| 2012/0016581 A1 | 1/2012 | Mochizuki et al. | |
| 2012/0025965 A1 * | 2/2012 | Mochizuki | B60Q 9/008 340/435 |
| 2012/0215381 A1 * | 8/2012 | Wang | A01D 41/1278 701/2 |
| 2012/0218093 A1 | 8/2012 | Yoshizawa et al. | |
| 2013/0015984 A1 * | 1/2013 | Yamashiro | G08G 1/22 340/988 |
| 2013/0099911 A1 | 4/2013 | Mudalige et al. | |
| 2013/0116915 A1 | 5/2013 | Ferreira et al. | |
| 2013/0154853 A1 * | 6/2013 | Chen | G08G 1/096716 340/905 |
| 2013/0179047 A1 | 7/2013 | Miller et al. | |
| 2013/0278440 A1 * | 10/2013 | Rubin | G08G 9/02 340/903 |
| 2013/0278441 A1 * | 10/2013 | Rubin | G08G 9/02 340/905 |
| 2013/0278443 A1 * | 10/2013 | Rubin | G08G 9/02 340/905 |
| 2013/0279491 A1 * | 10/2013 | Rubin | G08G 1/166 370/347 |
| 2013/0282277 A1 * | 10/2013 | Rubin | G08G 9/02 701/517 |
| 2013/0297195 A1 * | 11/2013 | Das | G08G 1/163 701/117 |
| 2014/0307628 A1 * | 10/2014 | Stahlin | G08G 1/0112 370/328 |
| 2014/0347486 A1 | 11/2014 | Okouneva | |

(56) References Cited

U.S. PATENT DOCUMENTS

| | | | |
|---|---|---|---|
| 2015/0078291 A1* | 3/2015 | Guner | H04W 84/18 370/329 |
| 2015/0197248 A1 | 7/2015 | Breed et al. | |
| 2015/0200957 A1* | 7/2015 | Zhang | B60W 30/09 726/22 |
| 2015/0348412 A1* | 12/2015 | Onishi | G08G 1/096791 340/905 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

* cited by examiner

MESSAGE OCCLUSION DETECTION SYSTEM AND METHOD IN A VEHICLE-TO-VEHICLE COMMUNICATION NETWORK

TECHNICAL FIELD

This disclosure relates to the field of vehicle-to-vehicle communications.

BACKGROUND

Computerization of certain aspects of vehicles has led to a shift from completely manual control of vehicles to vehicles in which drivers are provided with varying levels of assistance. Some systems are passive in nature. In a passive system, a condition is detected, and the driver is warned of the condition. Other systems are active in nature. In an active system, a condition is detected, and the vehicle assumes control of a certain system or modifies the control inputs made by the driver.

Some driver assistance systems are intended to warn drivers as to potential collisions. Collision warning systems that are currently in wide use rely on detection and ranging systems that utilize technologies such as Sonar, Radar, and Lidar. The signals generated by the detection and ranging system is used as a basis for determining whether a collision is imminent. While these systems work well for stationary objects, they can be largely inadequate for vehicle collision avoidance, as they require line of sight to the other vehicle, and cannot make a determination of driver intent.

Some current research and development efforts are directed to collision warning systems that are based on vehicle-to-vehicle (V2V) communications. Since V2V communication does not require line of sight, it provides a distinct advantage over detection and ranging systems. One example of V2V communication is a system in which vehicles exchange a basic safety message or "BSM." The BSM that is broadcast by a vehicle can contain a number of data elements that describe various aspects of the operation of the vehicle or provide information about the vehicle itself. As one example, the BSM can include location and trajectory information. As another example, the BSM can include information that describes the vehicle type and size for the vehicle.

Some of these systems use the BSM information to determine actual vehicle locations relative to a map, and then use this information to determine whether a collision is possible. Other systems use the BSM information to determine the relative positions and relative trajectories of two vehicles, and then use this information to determine whether a collision is possible.

SUMMARY

Vehicle intersection warning systems and methods with message occlusion detection are disclosed herein.

One aspect of the disclosure is a method for providing information to a driver of a vehicle. The method includes receiving, at a host vehicle via a wireless electronic communication link, messages that each include remote vehicle information for a respective one of the one or more remote vehicles. The method also includes identifying host vehicle information for the host vehicle and determining that a potential message occlusion exists based at least in part on the remote vehicle information for the one or more remote vehicles and the host vehicle information. The method also includes causing a message occlusion alert to be output in response to determining that a potential message occlusion exists.

Another aspect of the disclosure is a vehicle that includes a wireless electronic communication device, one or more sensors, an output system including at least one of an audio output device or a visual output device, and an information system operable to execute instructions. The instructions cause the information system to receive, at a host vehicle via a wireless electronic communication link, messages that each include remote vehicle information for a respective one of the one or more remote vehicles, identify host vehicle information for the host vehicle, and determine that a potential message occlusion exists based at least in part on the remote vehicle information for the one or more remote vehicles and the host vehicle information. The instructions also cause the information system to cause a message occlusion alert to be output using the output system in response to determining that a potential message occlusion exists.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A vehicle warning system may output an alert such as a warning alert or an informative alert at an intersection when an oncoming car is detected. In vehicle warning systems, these alerts can only be output reliably when messages are received from all other vehicles in the vicinity. Typical vehicle warning systems that rely on vehicle-to-vehicle communications utilize communications technologies that are able to transmit messages 300 meters in ideal conditions. Some vehicle-to-vehicle communications systems use communications technologies that only function reliably when line-of-sight between communicating vehicles is present. As a result, the presence of objects between two vehicles can cause message that are sent by a first vehicle to fail to reach a second vehicle. This is referred to as "message occlusion." This systems and methods described herein output message occlusion alerts upon detecting circumstances under which messages may be occluded. A message is considered to be occluded when an object, either mobile or fixed, is positioned between a vehicle sending a message and a vehicle that would receive the message but for presence of the object. An occlusion alert is an audible or visible indication that is presented to the driver of the vehicle and indicates that the driver should exercise caution.

Figure 1:
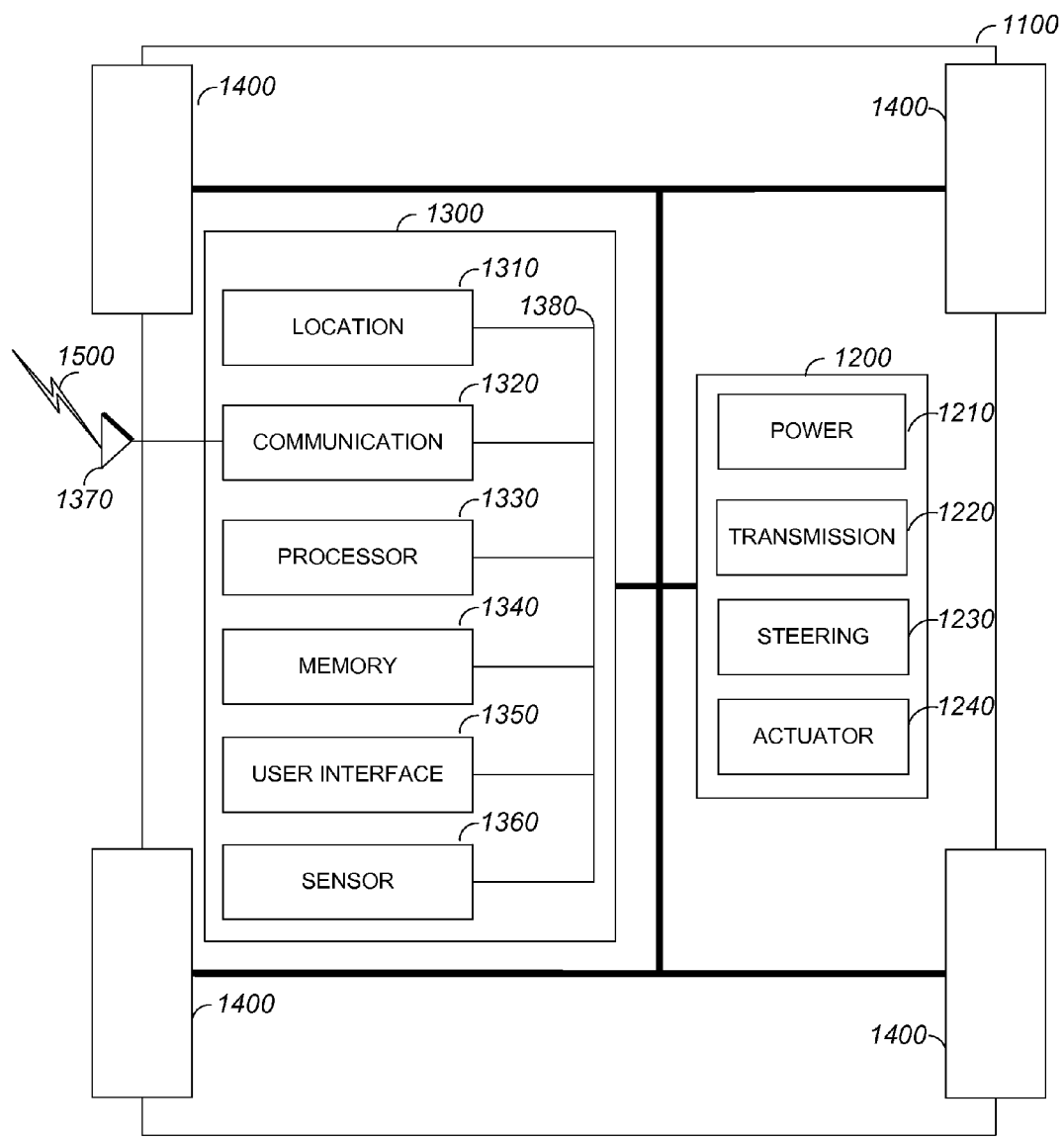
FIG. 1 is a diagram of an example of a vehicle.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine -Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
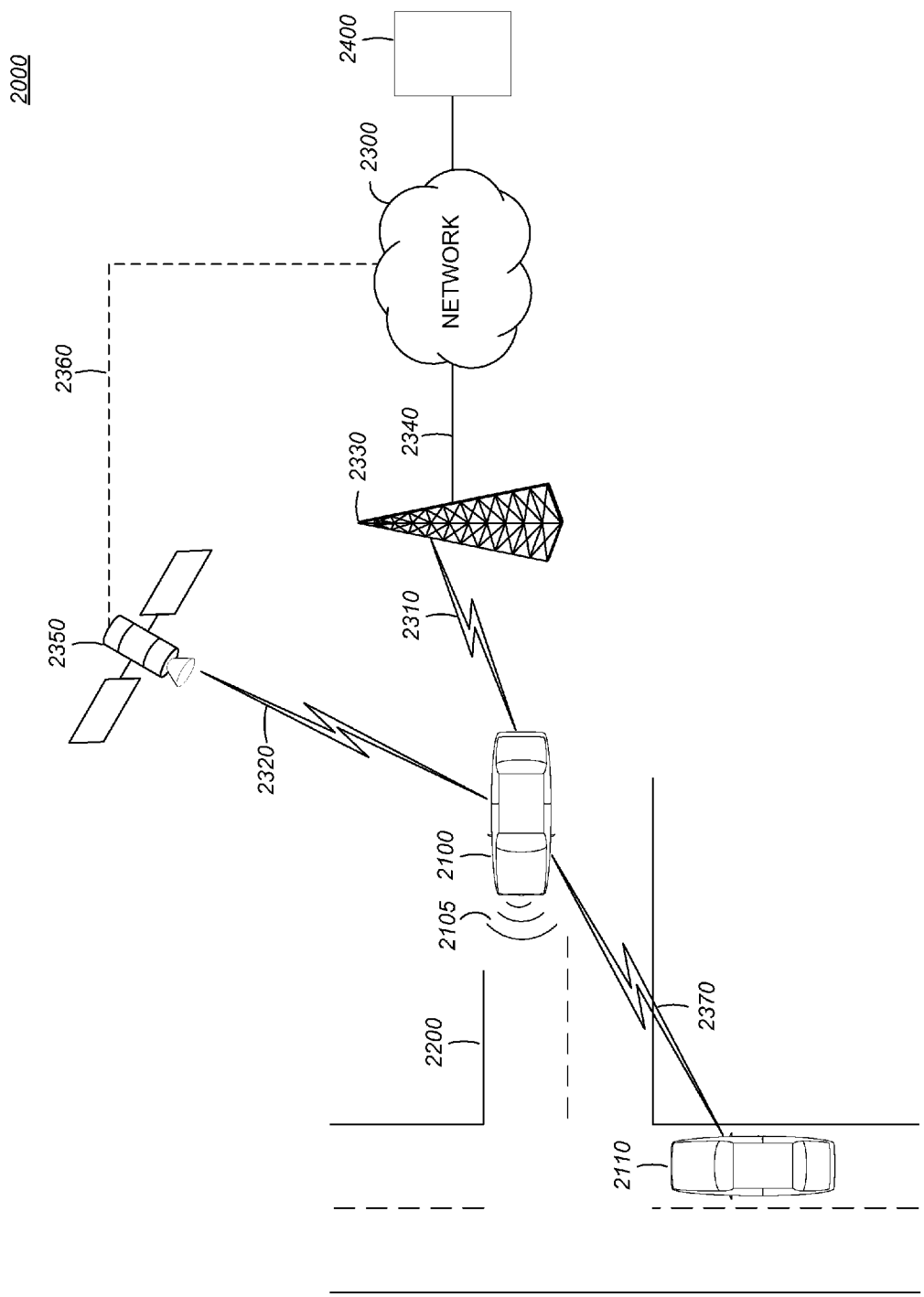
FIG. 2 is a diagram of an example of a portion of a vehicle transportation and communication system.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links For example, the vehicle 2100 may communicate with the communication device 2400 via a direct communication link, such as a Bluetooth communication link.

FIGS. 3-14 show examples of diagrams representing vehicles operating in one or more portions of one or more vehicle transportation networks. For simplicity and clarity a host vehicle is shown with stippling and remote vehicles are shown in white. For simplicity and clarity the diagrams shown in FIGS. 3-14 are oriented with north at the top and east at the right side. In some embodiments, a defined geospatial range is shown as approximately 300 meters; however, other ranges may be used.

Figure 3:
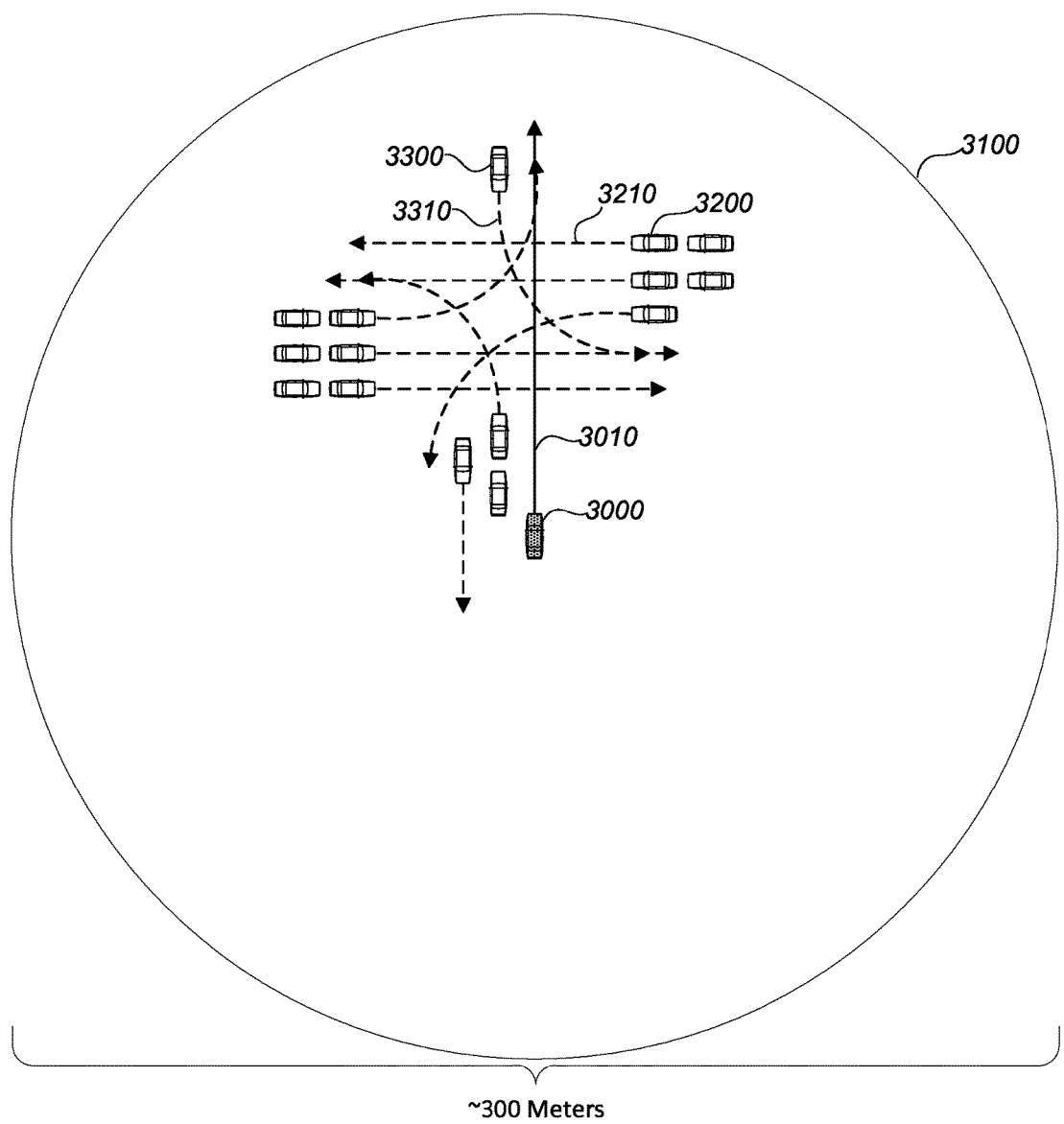
FIG. 3 is a diagram of geospatially locating remote vehicles based on automated inter-vehicle messages.

FIG. 3 is a diagram of geospatially locating remote vehicles based on automated inter-vehicle messages. Geospatially locating remote vehicles based on automated inter-vehicle messages may be implemented in a vehicle, such as the vehicle 1000 shown in FIG. 1 or the vehicles 2100/2110 shown in FIG. 2. In some embodiments, one or more of the vehicles shown in FIG. 3, including the remote vehicles, the host vehicle, or both, may be stationary or may be in motion.

In some embodiments, a host vehicle 3000 may traverse a portion of a vehicle transportation network (not expressly shown), may receive automated inter-vehicle communications from one or more remote vehicles 3100/3200 within a defined geospatial range 3300, and may transmit automated inter-vehicle communications to one or more remote vehicles 3100/3200 within the defined geospatial range 3300. For simplicity and clarity, an automated inter-vehicle communication received by a host vehicle from a remote vehicle may be referred to herein as a remote vehicle message. For example, the host vehicle 3000 may receive the remote vehicle messages via a wireless electronic communication link, such as the direct communication link 2370 shown in FIG. 2.

In some embodiments, the automated inter-vehicle messages may indicate information such as geospatial location information and heading information. In some embodiments, the host vehicle 3000 may transmit one or more automated inter-vehicle messages including host vehicle information, such as host vehicle heading information. For example, as shown in FIG. 3, the host vehicle heading information may indicate that the host vehicle 3000 is heading straight ahead. In some embodiments, a remote vehicle 3100 may transmit one or more automated inter-vehicle messages including remote vehicle information, such as remote vehicle heading information. For example, the remote vehicle heading information may indicate that the remote vehicle 3200 is heading straight west. In another example, a remote vehicle 3100 may transmit one or more automated inter-vehicle messages including remote vehicle information that includes remote vehicle heading information, which may indicate that the remote vehicle 3100 is heading south.

In some embodiments, the host vehicle 3000 may identify a host vehicle expected path 3010 for the host vehicle based on host vehicle information, such as host vehicle geospatial state information and host vehicle kinematic state information. In some embodiments, the host vehicle 3000 may identify a remote vehicle expected path for a remote vehicle based on the automated inter-vehicle messages, which may include remote vehicle information, such as remote vehicle geospatial state information and remote vehicle kinematic state information. For example, the remote vehicle messages transmitted by the remote vehicle 3200 in the upper right of FIG. 3 may indicate that the remote vehicle 3200 is heading west, and the host vehicle 3000 may identify the remote vehicle expected path 3210 for the remote vehicle 3200. In another example, the remote vehicle messages transmitted by the remote vehicle 3100 in the upper left of FIG. 3 may indicate that the remote vehicle 3100 is heading south, and may include navigation information, such as turn signal information indicating a left turn, and the host vehicle 3000 may identify the remote vehicle expected path 3110 for the remote vehicle 3100.

For simplicity and clarity the heading and expected path of the host vehicle 3000 are shown as a solid directional line and the expected paths of respective remote vehicles are shown as directional broken lines. Expected paths are omitted from FIG. 3 for some vehicles for simplicity and clarity.

Figure 4:
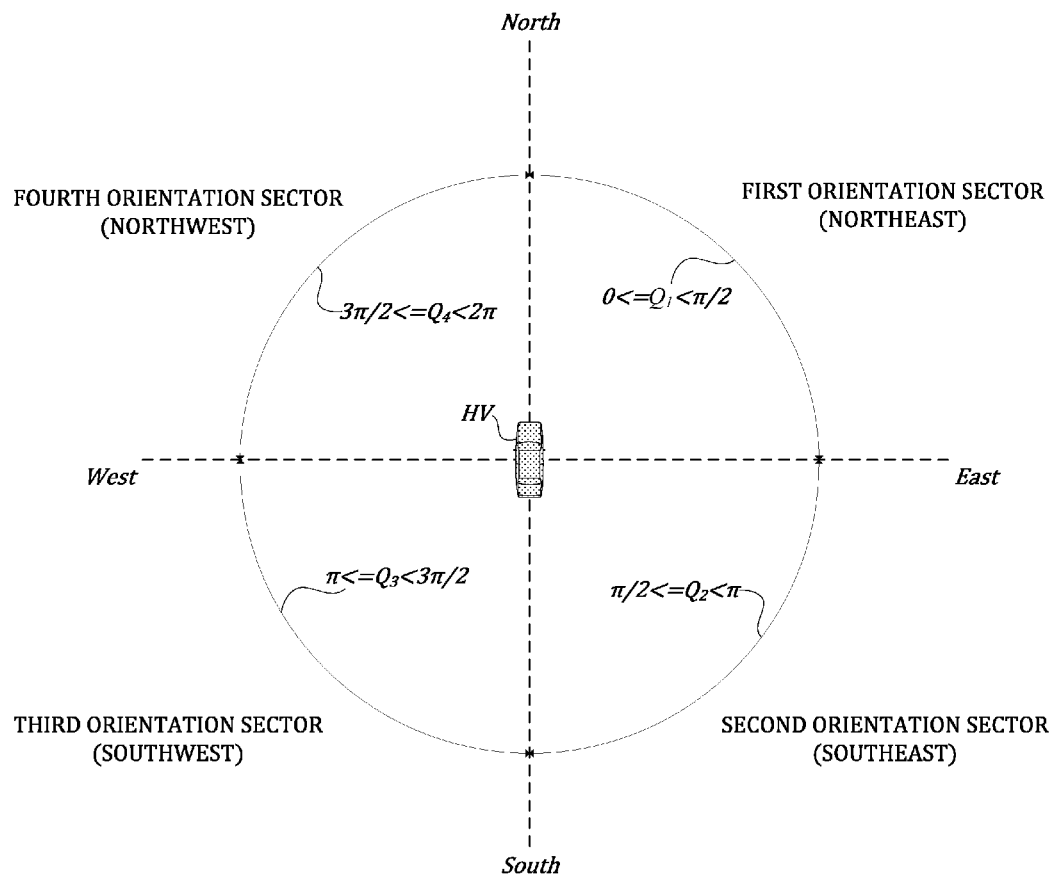
FIG. 4 is a diagram showing orientation sectors.

FIG. 4 is a diagram showing orientation sectors. In some embodiments, geospatial location of remote vehicles can include determining an orientation sector ($Q_n$), which may indicate a quantized geospatial location, or direction, of a remote vehicle, relative to the host vehicle, in the geospatial domain. In some embodiments, locations relative to the host vehicle location may be quantized into a defined number, quantity, count, or cardinality, of orientation sectors (Q). For example, the defined set of orientation sectors (Q) may include four orientation sectors, or quadrants, which may include ninety degrees each. However, any number, size, and direction of orientation sectors may be used. Although the host vehicle is shown in FIG. 4 as heading north, the orientation sector may be identified relative to the host vehicle geospatial location independently of the heading, path, or route of the host vehicle.

In some embodiments, the defined set of orientation sectors may be identified in the geospatial domain relative to the host vehicle and a reference direction, such as north. For simplicity and clarity the angles described herein, such are identified clockwise. For example, relative to the host vehicle, the reference direction, north, may correspond with zero degrees (0°, 360°, 2π), east may correspond with ninety degrees (90°, π/2), south may correspond with 180 degrees (180°, π), and west may correspond with 270 degrees (270°, 3π/2).

As shown in FIG. 4, in some embodiments, the orientation sectors (Q) may include a first orientation sector $Q_1$ to the northeast of the host vehicle, which may include locations from zero degrees (0°, 360°, 2π, or north) to ninety degrees (90°, π/2, or east), which may be expressed as $0<=Q_1<\pi/2$. The orientation sectors (Q) may include a second orientation sector $Q_2$ to the southeast of the host vehicle, which may include locations from ninety degrees (90° or π/2) to 180 degrees (180°, π, or south), which may be expressed as $\pi/2<=Q_2<\pi$. The orientation sectors (Q) may include a third orientation sector $Q_3$ to the southwest of the host vehicle, which may include locations from 180 degrees (180° or π) to 270 degrees (270°, 3π/2, or west), which may be expressed as $\pi<=Q_3<3\pi/2$. The orientation sectors (Q) may include a fourth orientation sector $Q_4$ to the northwest of the host vehicle, which may include locations from 270 degrees (270°, 3π/2, or west) to 360 degrees (0°, 360°, 2π, or north), which may be expressed as $3\pi/2<=Q_4<360$.

Figure 5:
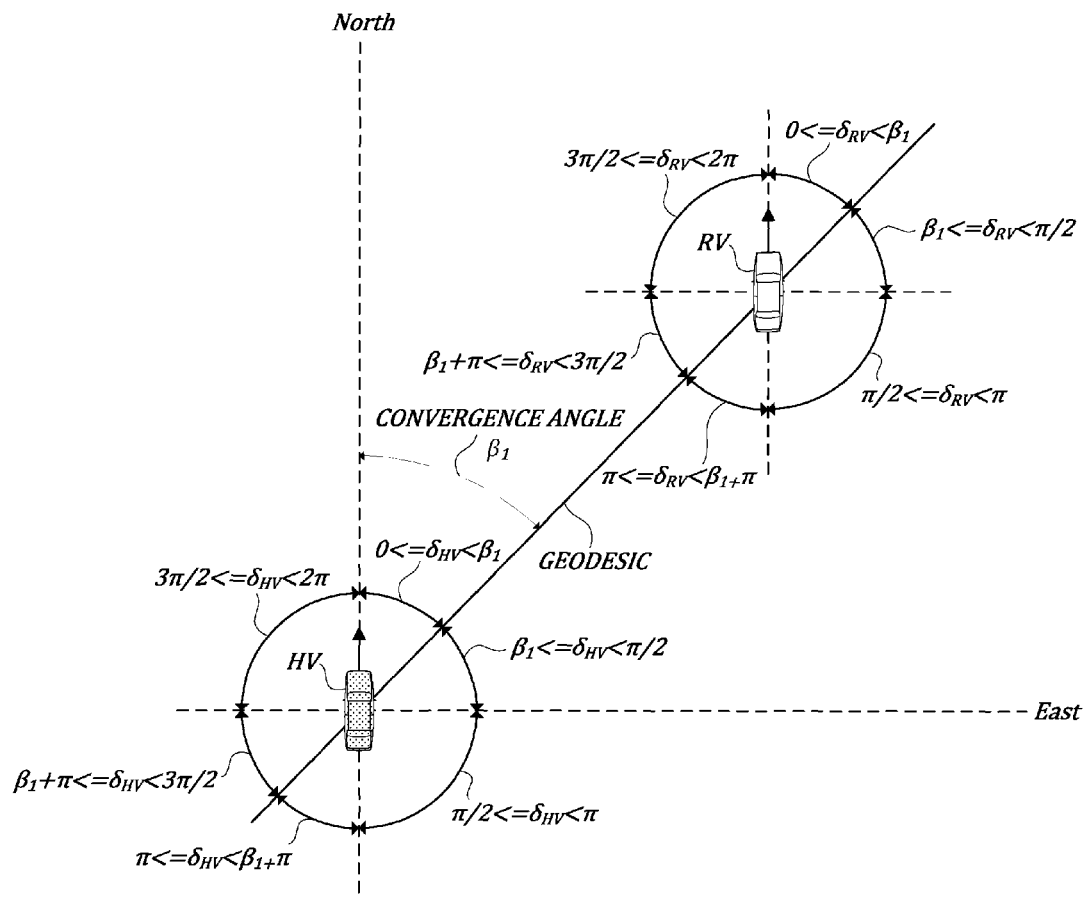
FIG. 5 is a diagram of identifying inter-vehicle state information including a geodesic for a first orientation sector.
Figure 6:
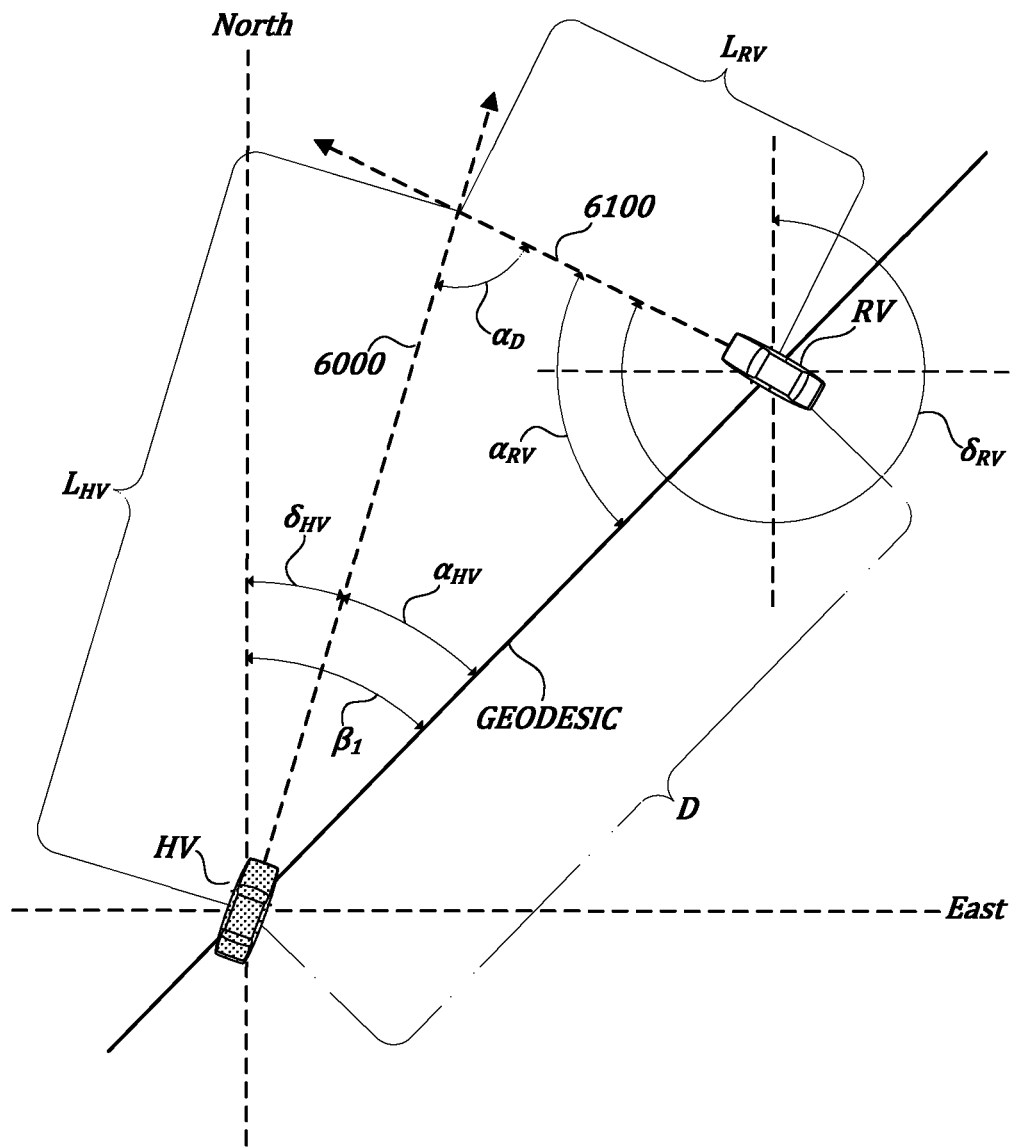
FIG. 6 is a diagram of identifying inter-vehicle state information including convergence information for the first orientation sector.
Figure 7:
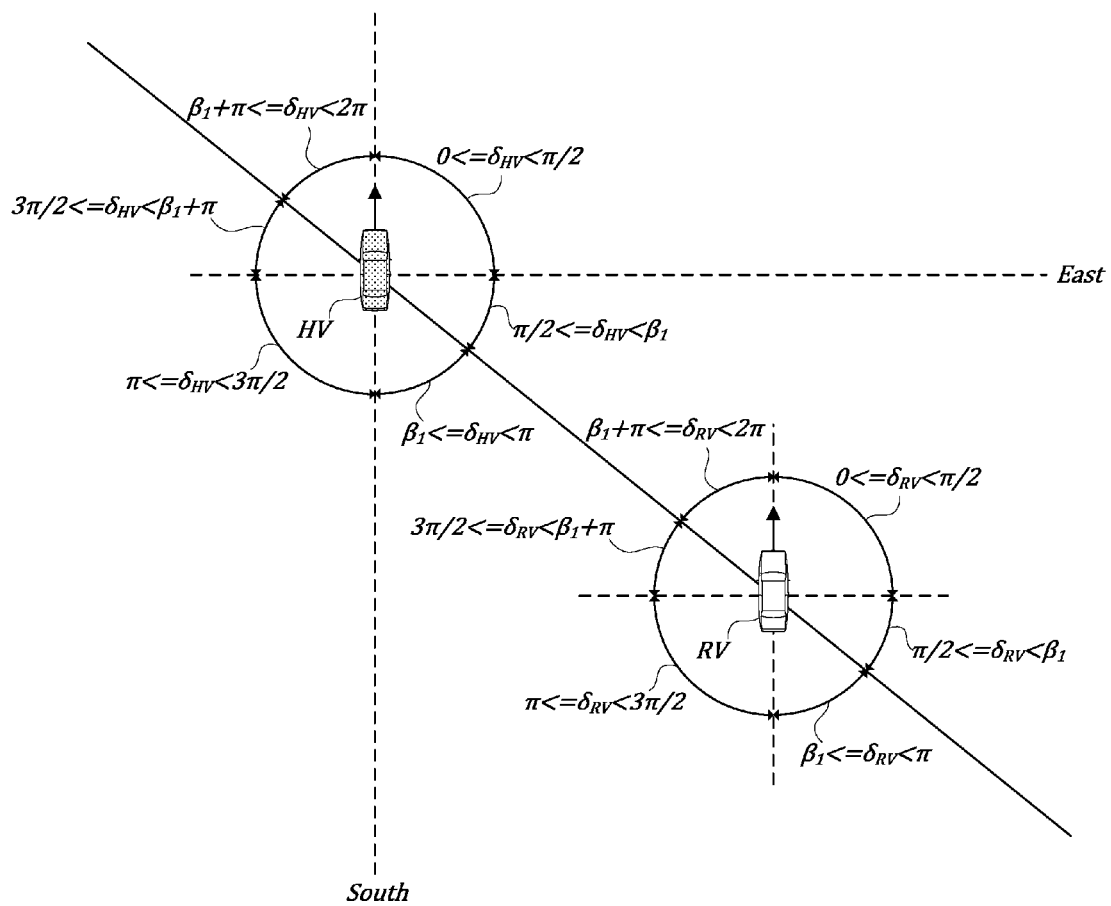
FIG. 7 is a diagram of identifying inter-vehicle state information including a geodesic for a second orientation sector.
Figure 8:
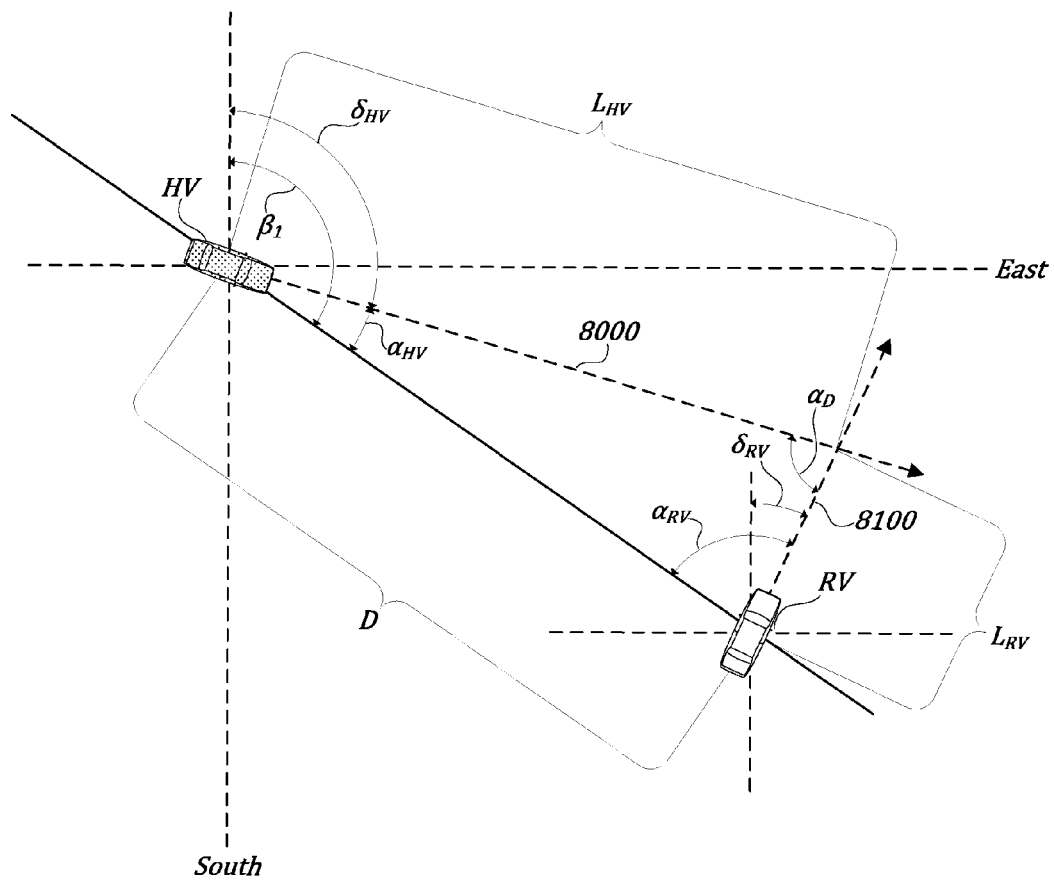
FIG. 8 is a diagram of identifying inter-vehicle state information including convergence information for the second orientation sector.
Figure 9:
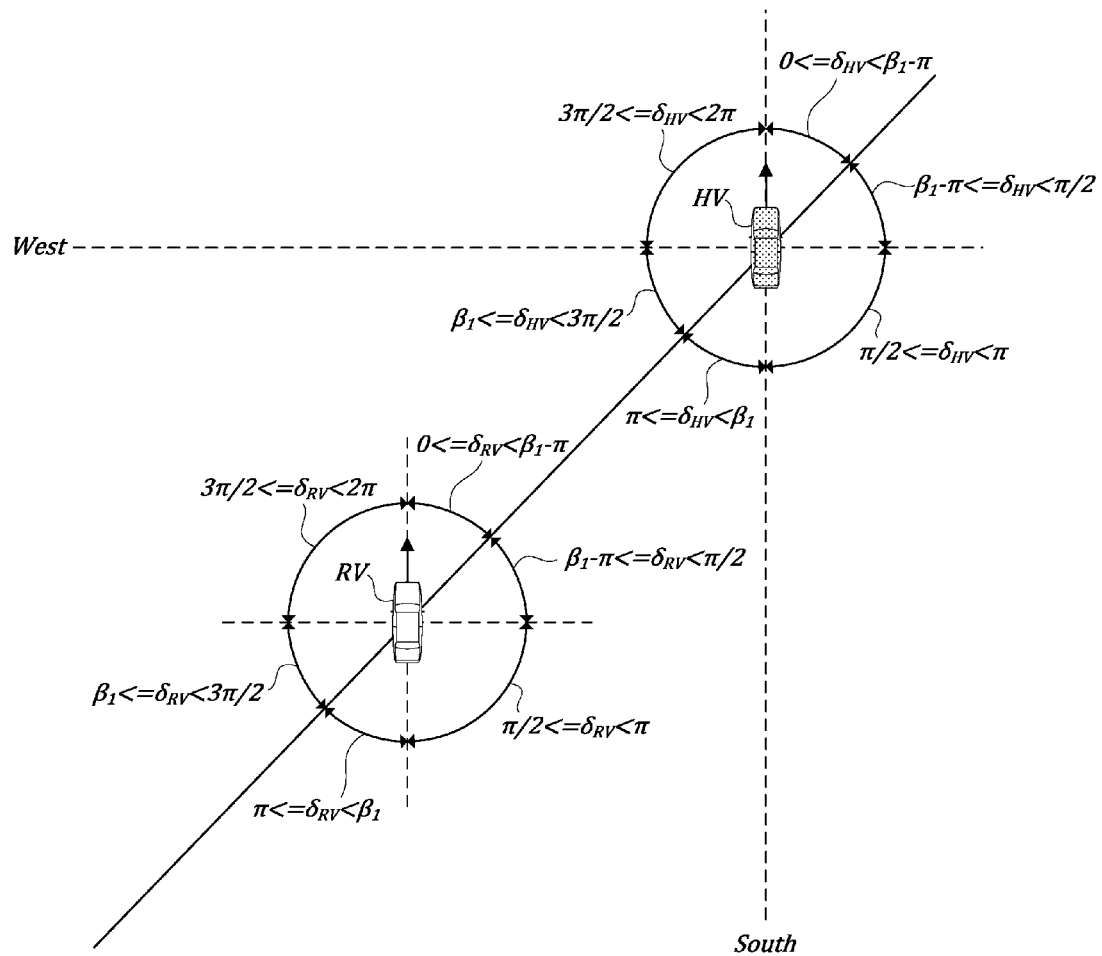
FIG. 9 is a diagram of identifying inter-vehicle state information including a geodesic for a third orientation sector.
Figure 10:
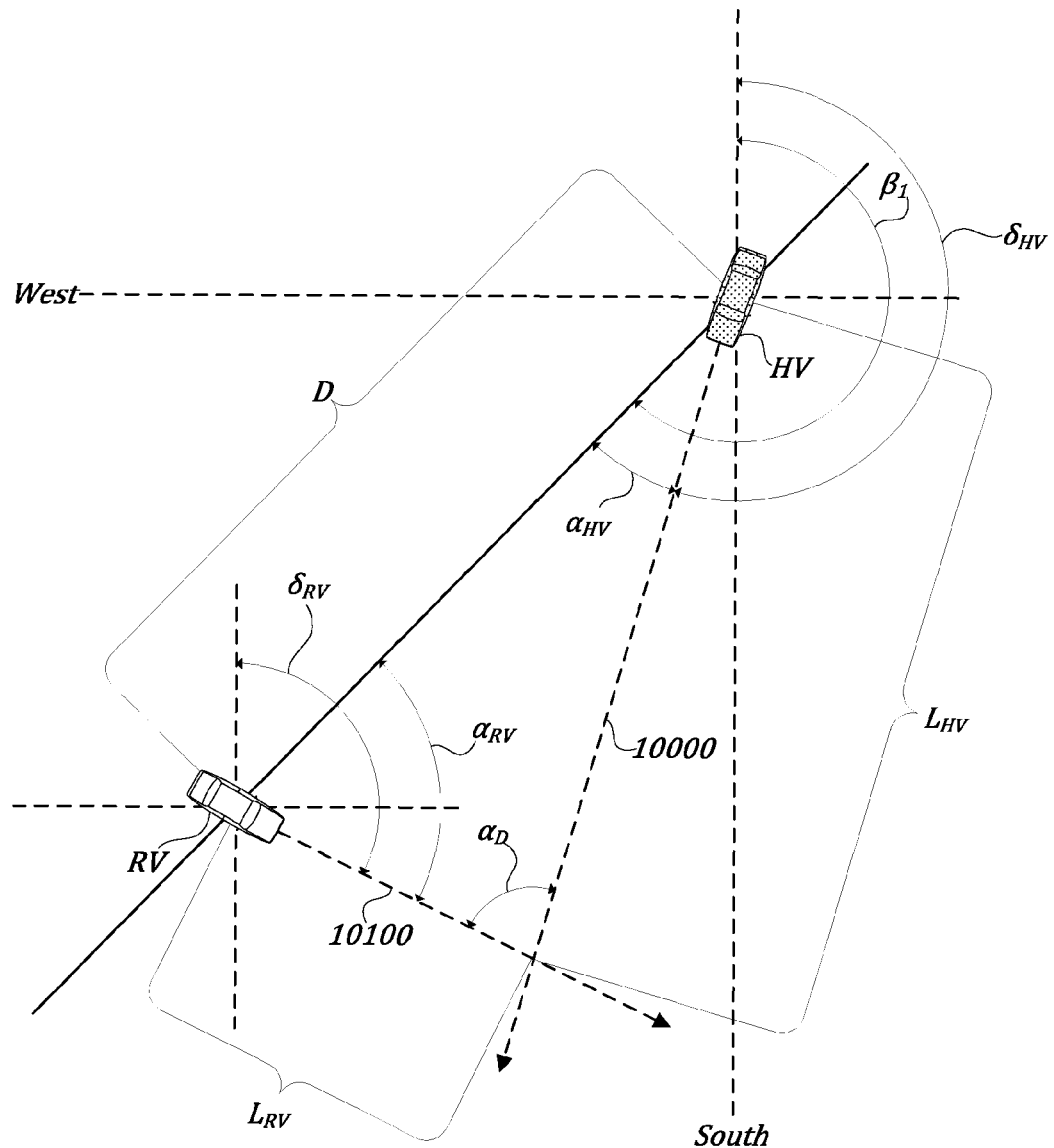
FIG. 10 is a diagram of identifying inter-vehicle state information including convergence information for the third orientation sector.
Figure 11:
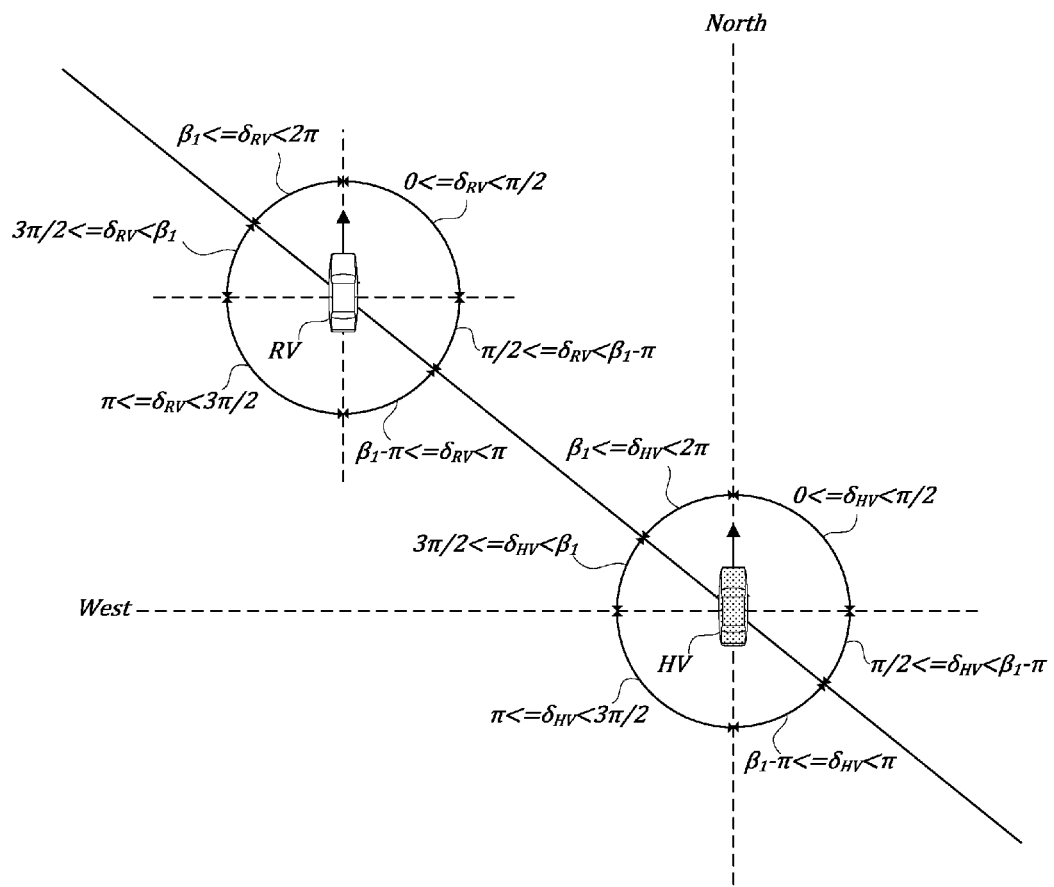
FIG. 11 is a diagram of identifying inter-vehicle state information including a geodesic for a fourth orientation sector.
Figure 12:
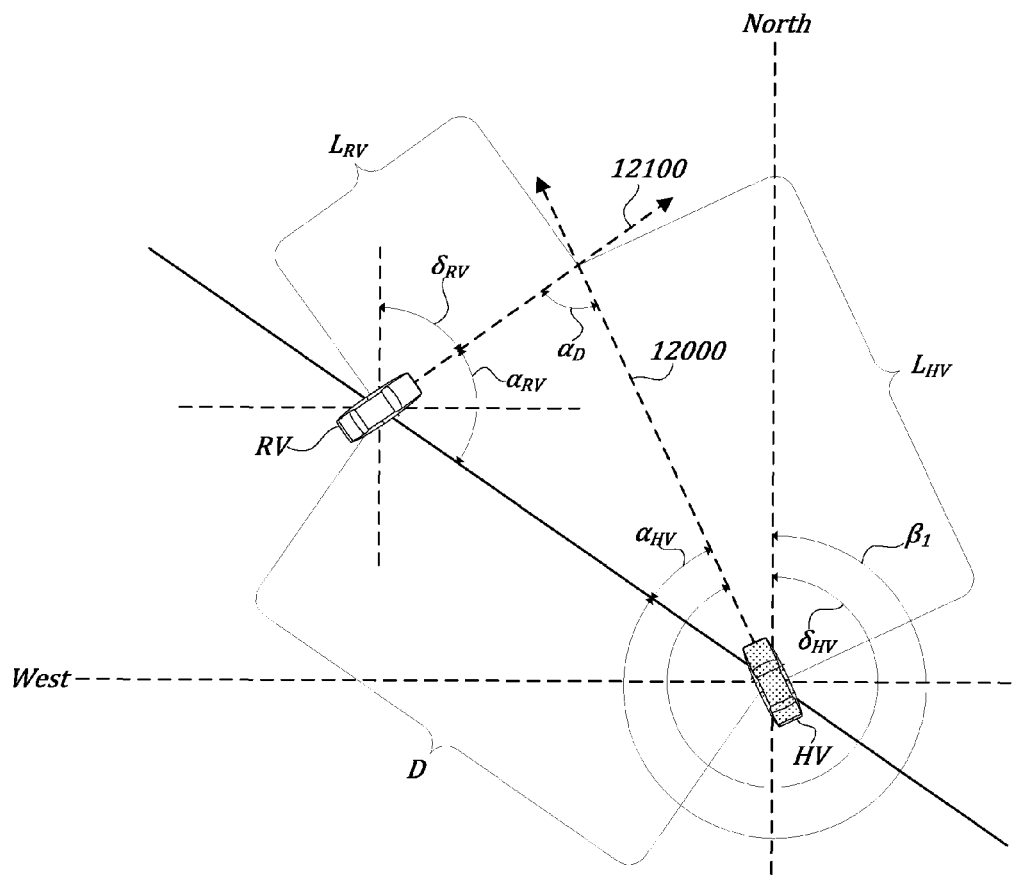
FIG. 12 is a diagram of identifying inter-vehicle state information including convergence information for the fourth orientation sector.

Geospatially locating remote vehicles can include identifying inter-vehicle state information, such as information describing the geospatial position and path of respective remote vehicles relative to the host vehicle location and expected path. Examples using the first orientation sector $Q_1$ are shown in FIGS. 5-6. Examples using the second orientation sector $Q_2$ are shown in FIGS. 7-8. Examples using the third orientation sector $Q_3$ are shown in FIGS. 9-10. Examples using the fourth orientation sector $Q_4$ are shown in FIGS. 11-12.

FIG. 5 is a diagram of identifying inter-vehicle state information including a geodesic for a first orientation sector. Identifying inter-vehicle state information may be implemented in a vehicle, such as the vehicle 1000 shown in FIG. 1 or the vehicles 2100/2110 shown in FIG. 2.

In some implementations, a geodesic between the host vehicle (HV) and a respective remote vehicle (RV) is determined. A geodesic may indicate a geospatially direct line between a host vehicle and a respective remote vehicle, and may be determined relative to the host vehicle in the geospatial domain. The geodesic may be the shortest direct navigable or unnavigable line between the host vehicle and the remote vehicle respective of the curvature of the earth. In FIGS. 5-12 the geodesic is shown as a solid line intersecting with the host vehicle and the remote vehicle. Although the geodesic is shown as extending beyond the vehicle for clarity, the length of the geodesic may correspond with a geospatially direct line distance between the host vehicle and the remote vehicle.

A geodesic can be described by a convergence angle $\beta_1$ for the geodesic. The convergence angle $\beta_1$ indicates an angle between the geodesic and a reference direction relative to the host vehicle in the geospatial domain. In implementations where the reference direction is North, the convergence angle $\beta_1$ is measured between a North-South reference line and the geodesic. For simplicity, in FIG. 5, the vehicles are shown heading north; however, the geodesic and convergence angle $\beta_1$ may be identified independently of vehicle heading. Although described herein with a reference direction of north, other reference directions can be used. For example, in some embodiments, the direction of the geodesic as the reference direction and the convergence angle $\beta_1$ may be zero degrees.

In some embodiments, the geodesic may be determined based on host vehicle information, such as a geospatial location of the host vehicle, remote vehicle information, such as a geospatial location of the remote vehicle, or a combination thereof. For example, the host vehicle information may indicate a longitude ($\theta_{HV}$) for the host vehicle, a latitude ($\phi_{HV}$) for the host vehicle, or both, the remote vehicle information may indicate a longitude ($\theta_{RV}$) for the remote vehicle, a latitude ($\phi_{RV}$) for the remote vehicle, or both, $\sigma$ may indicate a very small value used to avoid dividing by zero, and determining the convergence angle $\beta_1$ may be expressed as the following:

$$\beta_1 = \pi \left[ \frac{\theta_{HV} - \theta_{RV} - \sigma}{|\theta_{HV} - \theta_{RV}| + \sigma} + 1 \right] - \cos^{-1}\left( \frac{(\phi_{RV} - \phi_{HV})}{\sqrt{(\theta_{RV} - \theta_{HV})^2 \cos^2\phi_{HV} + (\phi_{RV} - \phi_{HV})^2}} \right) \left[ \frac{\theta_{HV} - \theta_{RV} - \sigma}{|\theta_{HV} - \theta_{RV}| + \sigma} \right].$$ [Equation 1]

In some embodiments, a length of the geodesic, which may correspond to a geospatially direct line distance, or instantaneous distance, D between the host vehicle and the remote vehicle, may be determined based on the host vehicle information, the remote vehicle information, or a combination thereof. For example, f may indicate an earth flattening value, such as f=1/298.257223563, $r_e$ may indicate a measure of the earth's equatorial radius, such as $r_e$=6,378,137 meters, and determining the distance D may be expressed as the following:

$$D = (1-f)r_e \sqrt{\frac{(\theta_{RV} - \theta_{HV})^2 \cos^2\phi_{HV} + (\phi_{RV} - \phi_{HV})^2}{\sin^2\phi_{HV} + (1-f)^2 \cos^2\phi_{HV}}}.$$ [Equation 2]

As shown in FIG. 4, an orientation sector may be generated and utilized to indicate a geospatial location of a remote vehicle relative to the host vehicle. The orientation sector may correspond with the convergence angle $\beta_1$, which may indicate the location of the geodesic relative to the reference direction and the host vehicle.

A host vehicle region may be used to indicate a quantization of a host vehicle heading angle $\delta_{HV}$. The host vehicle heading angle $\delta_{HV}$ may indicate the host vehicle heading or expected path relative to the host vehicle and the geodesic in the geospatial domain. For example, relative to the orientation sector, directions from the host vehicle may be quantized into a defined cardinality of regions, such as six regions as shown.

For example, for the first orientation sector $Q_1$, the remote vehicle, and the geodesic, is located to the northeast of the host vehicle in the geospatial domain. A first host vehicle region may include host vehicle heading angles $\delta_{HV}$ from the reference direction, which may correspond with north, to the convergence angle $\beta_1$ of the geodesic, which may be expressed as $0<=\delta_{HV}<\beta_1$. A second host vehicle region may include host vehicle heading angles $\delta_{HV}$ from the convergence angle $\beta_1$ of the geodesic to ninety degrees, which may correspond with east, and which may be expressed as $\beta_1<=\delta_{HV}<\pi/2$. A third host vehicle region may include host vehicle heading angles $\delta_{HV}$ from ninety degrees to 180 degrees, which may correspond with south, and which may be expressed as $\pi/2<=\delta_{HV}<\pi$. A fourth host vehicle region may include host vehicle heading angles $\delta_{HV}$ from 180 degrees to the opposite of the convergence angle $\beta_1+\pi$ of the geodesic, which may be expressed as $\pi<=\delta_{HV}<\beta_1+\pi$. A fifth host vehicle region may include host vehicle heading angles $\delta_{HV}$ from the opposite, with respect to the vertical, of the convergence angle $\beta_1+\pi$ of the geodesic, to 270 degrees, which may correspond with west, and which may be expressed as $\beta_1+\pi<=\delta_{HV}<3\pi/2$. A sixth host vehicle region may include host vehicle heading angles $\delta_{HV}$ from 270 degrees to 360 degrees, which may correspond with the reference direction, north, and which may be expressed as $\beta_1+\pi<=\delta_{HV}<3\pi/2$.

A remote vehicle region for the remote vehicle may be determined to indicate a quantization of a remote vehicle heading angle $\delta_{RV}$. The remote vehicle heading angle $\delta_{RV}$, which may indicate the remote vehicle heading or expected path, relative to the remote vehicle and the geodesic in the geospatial domain, and which may be determined relative to the orientation sector. For example, relative to the orientation sector, directions from the remote vehicle may be quantized into a defined cardinality of regions, such as six regions as shown, which may correspond with the host vehicle regions.

For example, for the first orientation sector $Q_1$, a first remote vehicle region may include remote vehicle heading angles $\delta_{RV}$ from the reference direction, which may correspond with north, to the convergence angle $\beta_1$ of the geodesic, which may be expressed as $0<=\delta_{RV}<\beta_1$. A second remote vehicle region may include remote vehicle heading angles $\delta_{RV}$ from the convergence angle $\beta_1$ of the geodesic to ninety degrees, which may correspond with east, and which may be expressed as $\beta_1<=\delta_{RV}<\pi/2$. A third remote vehicle region may include remote vehicle heading angles $\delta_{RV}$ from ninety degrees to 180 degrees, which may correspond with south, and which may be expressed as $\pi/2<=\delta_{RV}<\pi$. A fourth remote vehicle region may include remote vehicle heading angles $\delta_{RV}$ from 180 degrees to the opposite of the convergence angle $\beta_1+\pi$ of the geodesic, which may be expressed as $\pi<=\delta_{RV}<\beta_1+\pi$. A fifth remote vehicle region may include remote vehicle heading angles $\delta_{RV}$ from the opposite of the convergence angle $\beta_1+\pi$ of the geodesic, to 270 degrees, which may correspond with west, and which may be expressed as $\beta_1+\pi<=\delta_{RV}<3\pi/2$. A sixth remote vehicle region may include remote vehicle heading angles $\delta_{HV}$ from 270 degrees to 360 degrees, which may correspond with the reference direction, north, and which may be expressed as $\beta_1+\pi<=\delta_{RV}<3\pi/2$.

FIG. 6 is a diagram of identifying inter-vehicle state information including convergence information for the first orientation sector. Identifying inter-vehicle state information may be implemented in a vehicle, such as the vehicle 1000 shown in FIG. 1 or the vehicles 2100/2110 shown in FIG. 2.

In some embodiments, for the first orientation sector $Q_1$, any or all of a host vehicle expected path 6000 for the host vehicle (HV), respective remote vehicle expected paths 6100 for one or more of the remote vehicles (RV), or respective expected paths 6000/6100 for the host vehicle and for one or more of the remote vehicles are identified. In some embodiments, the expected paths may be projected, such as in a straight line, from the respective heading information.

Some embodiments include determining whether the remote vehicle expected path and the host vehicle expected path are convergent. A determination that the remote vehicle expected path and the remote vehicle expected path are convergent may indicate that the host vehicle expected path and the respective remote vehicle expected path intersect.

In some embodiments, for the first orientation sector $Q_1$, determining whether the remote vehicle expected path and the host vehicle expected path are convergent may include examining defined convergence data, such as Table 1 below. In Table 1 a value of zero (0) indicates that the remote vehicle expected path and the host vehicle expected path are not convergent and do not cross, a value of one (1) indicates that the remote vehicle expected path and the host vehicle expected path are convergent and do cross. A value of $\eta_{HV}$ indicates that the remote vehicle expected path and the host vehicle expected path are convergent and do cross if the host vehicle heading angle $\delta_{HV}$ is greater than the remote vehicle heading angle $\delta_{RV}$ and are not convergent and do not cross if the remote vehicle heading angle $\delta_{RV}$ at least the host vehicle heading angle $\delta_{HV}$. A value of $\eta_{RV}$ indicates that the remote vehicle expected path and the host vehicle expected path are convergent and do cross if the host vehicle heading angle $\delta_{HV}$ is less than the remote vehicle heading angle $\delta_{RV}$ and are not convergent and do not cross if the host vehicle heading angle $\delta_{HV}$ is at least the remote vehicle heading angle $\delta_{RV}$. The notation $HV_n$ indicates that the host vehicle region is region n. For example, $HV_1$ indicates that the host vehicle region is the first region and $HV_6$ indicates that the host vehicle region is the sixth region. The notation $RV_n$ indicates that the remote vehicle region is region n. For example, $RV_1$ indicates that the remote vehicle region is the first region and $RV_6$ indicates that the remote vehicle region is the sixth region.

TABLE 1

|        | $RV_1$      | $RV_2$      | $RV_3$      | $RV_4$      | $RV_5$      | $RV_6$      |
|--------|-------------|-------------|-------------|-------------|-------------|-------------|
| $HV_1$ | $\eta_{HV}$ | 0           | 0           | 0           | 1           | 1           |
| $HV_2$ | 0           | $\eta_{RV}$ | 1           | 1           | 0           | 0           |
| $HV_3$ | 0           | 0           | $\eta_{RV}$ | 1           | 0           | 0           |
| $HV_4$ | 0           | 0           | 0           | $\eta_{RV}$ | 0           | 0           |
| $HV_5$ | 0           | 0           | 0           | 0           | $\eta_{HV}$ | 0           |
| $HV_6$ | 0           | 0           | 0           | 0           | 1           | $\eta_{HV}$ |

In some embodiments, for the first orientation sector $Q_1$, determining $\eta_{HV}$ may be expressed as the following:

$$\eta_{HV} = \frac{1}{2}\left[\frac{\delta_{HV} - \delta_{RV} - \sigma}{|\delta_{RV} - \delta_{HV}| + \sigma} + 1\right]. \quad \text{[Equation 3]}$$

In some embodiments, for the first orientation sector $Q_1$, determining $\eta_{RV}$ may be expressed as the following:

$$\eta_{RV} = \frac{1}{2}\left[\frac{\delta_{RV} - \delta_{HV} - \sigma}{|\delta_{RV} - \delta_{HV}| + \sigma} + 1\right]. \quad \text{[Equation 4]}$$

In some embodiments, for the first orientation sector $Q_1$, a combination ($F_{m,n}$) of the host vehicle heading angle $\delta_{HV}$ and the remote vehicle heading angle $\delta_{HV}$ may be expressed as shown in Tables 2-4.

TABLE 2

| $F_{m,n}$ | $RV_1$          | $RV_2$          | $RV_3$          | $RV_4$          | $RV_5$          | $RV_6$          |
|-----------|-----------------|-----------------|-----------------|-----------------|-----------------|-----------------|
| $HV_1$    | $H_1 \times R_1$ | $H_1 \times R_2$ | $H_1 \times R_3$ | $H_1 \times R_4$ | $H_1 \times R_5$ | $H_1 \times R_6$ |
| $HV_2$    | $H_2 \times R_1$ | $H_2 \times R_2$ | $H_2 \times R_3$ | $H_2 \times R_4$ | $H_2 \times R_5$ | $H_2 \times R_6$ |
| $HV_3$    | $H_3 \times R_1$ | $H_3 \times R_2$ | $H_3 \times R_3$ | $H_3 \times R_4$ | $H_3 \times R_5$ | $H_3 \times R_6$ |
| $HV_4$    | $H_4 \times R_1$ | $H_4 \times R_2$ | $H_4 \times R_3$ | $H_4 \times R_4$ | $H_4 \times R_5$ | $H_4 \times R_6$ |
| $HV_5$    | $H_5 \times R_1$ | $H_5 \times R_2$ | $H_5 \times R_3$ | $H_5 \times R_4$ | $H_5 \times R_5$ | $H_5 \times R_6$ |
| $HV_6$    | $H_6 \times R_1$ | $H_6 \times R_2$ | $H_6 \times R_3$ | $H_6 \times R_4$ | $H_6 \times R_5$ | $H_6 \times R_6$ |

TABLE 3

| $H_1$ | $\frac{1}{4}\left[\frac{\delta_{HV} - 0 - \sigma}{|\delta_{HV} - 0| + \sigma} + 1\right] \times \left[\frac{\beta_1 - \delta_{HV} - \sigma}{|\beta_1 - \delta_{HV}| + \sigma} + 1\right]$ |
|---|---|
| $H_2$ | $\frac{1}{4}\left[\frac{\delta_{HV} - \beta_1 - \sigma}{|\delta_{HV} - \beta_1| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
| $H_3$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\beta_1 + \pi - \delta_{HV} - \sigma}{|\beta_1 + \pi - \delta_{HV}| + \sigma} + 1\right]$ |
| $H_5$ | $\frac{1}{4}\left[\frac{\delta_{HV} - (\beta_1 + \pi) - \sigma}{|\delta_{HV} - (\beta_1 + \pi)| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_6$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{2\pi - \delta_{HV} - \sigma}{|2\pi - \delta_{HV}| + \sigma} + 1\right]$ |

TABLE 4

| $R_1$ | $\frac{1}{4}\left[\frac{\delta_{RV} - 0 - \sigma}{|\delta_{RV} - 0| + \sigma} + 1\right] \times \left[\frac{\beta_1 - \delta_{RV} - \sigma}{|\beta_1 - \delta_{RV}| + \sigma} + 1\right]$ |
|---|---|
| $R_2$ | $\frac{1}{4}\left[\frac{\delta_{RV} - \beta_1 - \sigma}{|\delta_{RV} - \beta_1| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
| $R_3$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\beta_1 + \pi - \delta_{RV} - \sigma}{|\beta_1 + \pi - \delta_{RV}| + \sigma} + 1\right]$ |
| $R_5$ | $\frac{1}{4}\left[\frac{\delta_{RV} - (\beta_1 + \pi) - \sigma}{|\delta_{RV} - (\beta_1 + \pi)| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_6$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{2\pi - \delta_{RV} - \sigma}{|2\pi - \delta_{RV}| + \sigma} + 1\right]$ |

In some embodiments, for the first orientation sector $Q_1$, a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$ are determined, as expressed in Table 5.

TABLE 5

| $\alpha_{HV} =$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_2$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_3$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_4$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_5$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ |
| $HV_6$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ |

Some embodiments include determining, for the first orientation sector $Q_1$, a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 6.

TABLE 6

| $\alpha_{RV} =$ | $RV_1$ | $RV_2$ | $RV_3$ | $RV_4$ | $RV_5$ | $RV_6$ |
|---|---|---|---|---|---|---|
| $HV_1$ | $\delta_{RV} - \beta_1 + \pi$ | 0 | 0 | 0 | $\delta_{RV} - \beta_1 - \pi$ | $\delta_{RV} - \beta_1 - \pi$ |
| $HV_2$ | 0 | $-(\delta_{RV} - \beta_1 - \pi)$ | $-(\delta_{RV} - \beta_1 - \pi)$ | $-(\delta_{RV} - \beta_1 - \pi)$ | 0 | 0 |
| $HV_3$ | 0 | 0 | $-(\delta_{RV} - \beta_1 - \pi)$ | $-(\delta_{RV} - \beta_1 - \pi)$ | 0 | 0 |
| $HV_4$ | 0 | 0 | 0 | $-(\delta_{RV} - \beta_1 - \pi)$ | 0 | 0 |
| $HV_5$ | 0 | 0 | 0 | 0 | $\delta_{RV} - \beta_1 - \pi$ | 0 |
| $HV_6$ | 0 | 0 | 0 | 0 | $\delta_{RV} - \beta_1 - \pi$ | $\delta_{RV} - \beta_1 - \pi$ |

Some embodiments include determining, for the first orientation sector $Q_1$, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 7.

TABLE 7

| $\alpha_D =$ | $RV_1$ | $RV_2$ | $RV_3$ | $RV_4$ | $RV_5$ | $RV_6$ |
|---|---|---|---|---|---|---|
| $HV_1$ | $\delta_{HV} - \delta_{RV}$ | 0 | 0 | 0 | $2\pi - \delta_{HV} - \delta_{RV}$ | $2\pi - \delta_{HV} - \delta_{RV}$ |
| $HV_2$ | 0 | $-(\delta_{HV} - \delta_{RV})$ | $-(\delta_{HV} - \delta_{RV})$ | $-(\delta_{HV} - \delta_{RV})$ | 0 | 0 |
| $HV_3$ | 0 | 0 | $-(\delta_{HV} - \delta_{RV})$ | $-(\delta_{HV} - \delta_{RV})$ | 0 | 0 |
| $HV_4$ | 0 | 0 | 0 | $-(\delta_{HV} - \delta_{RV})$ | 0 | 0 |
| $HV_5$ | 0 | 0 | 0 | 0 | $\delta_{RV} - \beta_1 - \pi$ | 0 |
| $HV_6$ | 0 | 0 | 0 | 0 | $\delta_{HV} - \delta_{RV}$ | $\delta_{HV} - \delta_{RV}$ |

In FIG. 6, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 7 is a diagram of identifying inter-vehicle state information including a geodesic for a second orientation sector. Identifying inter-vehicle state information including the geodesic for the second orientation sector may be similar to the identification shown in FIG. 5, except as described herein. In the second orientation sector $Q_2$ the remote vehicle, and the geodesic, is located to the southeast of the host vehicle in the geospatial domain.

As shown in FIG. 7, for the second orientation sector $Q_2$, some embodiments include determining a host vehicle region for the host vehicle. A first host vehicle region may include host vehicle heading angles $\delta_{HV}$ from the reference direction, which may correspond with north, to ninety degrees, which may correspond with east, and which may be expressed as $0 <= \delta_{HV} < \pi/2$. A second host vehicle region may include host vehicle heading angles $\delta_{HV}$ from ninety degrees to the convergence angle $\beta_1$ of the geodesic, and which may be expressed as $\pi/2 <= \delta_{HV} < \beta_1$. A third host vehicle region may include host vehicle heading angles $\delta_{HV}$ from the convergence angle $\beta_1$ of the geodesic to 180 degrees, which may correspond with south, and which may be expressed as $\beta_1 <= \delta_{HV} < \pi$. A fourth host vehicle region may include host vehicle heading angles $\delta_{HV}$ from 180 degrees to 270 degrees, which may correspond with west, and which may be expressed as $\pi <= \delta_{HV} <= 3\pi/2$. A fifth host vehicle region may include host vehicle heading angles $\delta_{HV}$ from 270 degrees to a sum of the convergence angle $\beta_1$ of the geodesic and 180 degrees $\pi$, which may be expressed as $3\pi/2 <= \delta_{HV} < \beta_1 + \pi$. A sixth host vehicle region may include host vehicle heading angles $\delta$ from the sum of the convergence angle $\beta_1$ of the geodesic and 180 degrees $\pi$ to 360 degrees, which may correspond with the reference direction, north, and which may be expressed as $\beta_1 + \pi <= \delta_{HV} < 2\pi$.

As shown in FIG. 7, for the second orientation sector, some embodiments include determining a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0 <= \delta_{RV} < \pi/2$. A second remote vehicle region may include remote vehicle heading angles $\delta_{RV}$ from ninety degrees to the convergence angle $\beta_1$ of the geodesic, and which may be expressed as $\pi/2 <= \delta_{RV} < \beta_1$. A third remote vehicle region may include remote vehicle heading angles $\delta_{RV}$ from the convergence angle $\beta_1$ of the geodesic to 180 degrees, which may correspond with south, and which may be expressed as $\beta_1 <= \delta_{RV} < \pi$. A fourth remote vehicle region may include remote vehicle heading angles $\delta_{RV}$ from 180 degrees to 270 degrees, which may correspond with west, and which may be expressed as $\pi <= \delta_{RV} < 3\pi/2$. A fifth remote vehicle region may include remote vehicle heading angles $\delta_{RV}$ from 270 degrees to a sum of the convergence angle $\beta_1$ of the geodesic and 180 degrees $\pi$, which may be expressed as $3\pi/2 <= \delta_{RV} < \beta_1 + \pi$. A sixth remote vehicle region may include remote vehicle heading angles $\delta_{RV}$ from the sum of the convergence angle $\beta_1$ of the geodesic and 180 degrees $\pi$ to 360 degrees, which may correspond with the reference direction, north, and which may be expressed as $\beta_1 + \pi <= \delta_{RV} < 2\pi$.

FIG. 8 is a diagram of identifying inter-vehicle state information including convergence information for the second orientation sector. Identifying inter-vehicle state information including a geodesic for the second orientation sector may be similar to the identification shown in FIG. 6, except as described herein.

Some embodiments include identifying, for the second orientation sector $Q_2$, a host vehicle expected path 8000 for the host vehicle (HV), respective remote vehicle expected paths 8100 for one or more of the remote vehicles (RV), or identifying respective expected paths 8000/8100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent. A determination that the remote vehicle expected path and the host vehicle expected path are convergent may indicate that the host vehicle expected path and the respective remote vehicle expected path intersect.

In some embodiments, for the second orientation sector $Q_2$, determining whether the remote vehicle expected path and the host vehicle expected path are convergent may include examining defined convergence data, such as the defined convergence data shown in Table 8.

TABLE 8

|  | $RV_1$ | $RV_2$ | $RV_3$ | $RV_4$ | $RV_5$ | $RV_6$ |
|---|---|---|---|---|---|---|
| $HV_1$ | $\eta_{HV}$ | 0 | 0 | 0 | 0 | 1 |
| $HV_2$ | 1 | $\eta_{HV}$ | 0 | 0 | 0 | 1 |
| $HV_3$ | 0 | 1 | $\eta_{RV}$ | 1 | 1 | 0 |
| $HV_4$ | 0 | 1 | 1 | $\eta_{RV}$ | 1 | 0 |
| $HV_5$ | 0 | 0 | 0 | 0 | $\eta_{RV}$ | 0 |
| $HV_6$ | 0 | 0 | 0 | 0 | 0 | $\eta_{HV}$ |

In some embodiments, for the second orientation sector, determining $\eta_{HV}$ may be expressed as shown in Equation 3. In some embodiments, determining $\eta_{RV}$ may be expressed as shown in Equation 4.

In some embodiments, for the second orientation sector $Q_2$, a combination ($F_{m,n}$) of the host vehicle heading angle $\delta_{HV}$ and the remote vehicle heading angle $\delta_{RV}$ may be expressed as shown in Tables 9-11.

TABLE 9

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 10

| $H_1$ | $\frac{1}{4}\left[\frac{\delta_{HV} - 0 - \sigma}{|\delta_{HV} - 0| + \sigma} + 1\right] \times \left[\frac{\frac{\pi}{2} - \delta_{HV} - \sigma}{|\frac{\pi}{2} - \delta_{HV}| + \sigma} + 1\right]$ |
|---|---|
| $H_2$ | $\frac{1}{4}\left[\frac{\delta_{HV} - \frac{\pi}{2} - \sigma}{|\delta_{HV} - \frac{\pi}{2}| + \sigma} + 1\right] \times \left[\frac{\beta_1 - \delta_{HV} - \sigma}{|\beta_1 - \delta_{HV}| + \sigma} + 1\right]$ |
| $H_3$ | $\frac{1}{4}\left[\frac{\delta_{HV} - \beta_1 - \sigma}{|\delta_{HV} - \beta_1| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{|\frac{3\pi}{2} - \delta_{HV}| + \sigma} + 1\right]$ |
| $H_5$ | $\frac{1}{4}\left[\frac{\delta_{HV} - \frac{3\pi}{2} - \sigma}{|\delta_{HV} - \frac{3\pi}{2}| + \sigma} + 1\right] \times \left[\frac{\beta_1 + \pi - \delta_{HV} - \sigma}{|\beta_1 + \pi - \delta_{HV}| + \sigma} + 1\right]$ |
| $H_6$ | $\frac{1}{4}\left[\frac{\delta_{HV} - (\beta_1 + \pi) - \sigma}{|\delta_{HV} - (\beta_1 + \pi)| + \sigma} + 1\right] \times \left[\frac{2\pi - \delta_{HV} - \sigma}{|2\pi - \delta_{HV}| + \sigma} + 1\right]$ |

TABLE 11

| $R_1$ | $\frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{|\frac{\pi}{2} - \delta_{RV}| + \sigma} + 1\right]$ |
|---|---|
| $R_2$ | $\frac{1}{4}\left[\frac{\delta_{RV} - \frac{\pi}{2} - \sigma}{|\delta_{RV} - \frac{\pi}{2}| + \sigma} + 1\right] \times \left[\frac{\beta_1 - \delta_{RV} - \sigma}{|\beta_1 - \delta_{RV}| + \sigma} + 1\right]$ |
| $R_3$ | $\frac{1}{4}\left[\frac{\delta_{RV} - \beta_1 - \sigma}{|\delta_{RV} - \beta_1| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{|\frac{3\pi}{2} - \delta_{RV}| + \sigma} + 1\right]$ |
| $R_5$ | $\frac{1}{4}\left[\frac{\delta_{RV} - \frac{3\pi}{2} - \sigma}{|\delta_{RV} - \frac{3\pi}{2}| + \sigma} + 1\right] \times \left[\frac{(\beta_1 + \pi) - \delta_{RV} - \sigma}{|(\beta_1 + \pi) - \delta_{RV}| + \sigma} + 1\right]$ |
| $R_6$ | $\frac{1}{4}\left[\frac{\delta_{RV} - (\beta_1 + \pi) - \sigma}{|\delta_{RV} - (\beta_1 + \pi)| + \sigma} + 1\right] \times \left[\frac{2\pi - \delta_{RV} - \sigma}{|2\pi - \delta_{RV}| + \sigma} + 1\right]$ |

Some embodiments include determining, for the second orientation sector $Q_2$, a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 12.

TABLE 12

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_2$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_3$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_4$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_5$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_6$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |

Some embodiments include determining, for the second orientation sector $Q_2$, a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 13.

TABLE 13

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $\delta_{RV}-\beta_1+\pi$ | 0 | 0 | 0 | 0 | $\delta_{RV}-\beta_1-\pi$ |
| $HV_2$ | $\delta_{RV}-\beta_1+\pi$ | $\delta_{RV}-\beta_1+\pi$ | 0 | 0 | 0 | $\delta_{RV}-\beta_1-\pi$ |
| $HV_3$ | 0 | 0 | $-(\delta_{RV}-\beta_1-\pi)$ | $-(\delta_{RV}-\beta_1-\pi)$ | $-(\delta_{RV}-\beta_1-\pi)$ | 0 |
| $HV_4$ | 0 | 0 | 0 | $-(\delta_{RV}-\beta_1-\pi)$ | $-(\delta_{RV}-\beta_1-\pi)$ | 0 |
| $HV_5$ | 0 | 0 | 0 | 0 | $-(\delta_{RV}-\beta_1-\pi)$ | 0 |
| $HV_6$ | 0 | 0 | 0 | 0 | 0 | $\delta_{RV}-\beta_1-\pi$ |

Some embodiments include determining, for the second orientation sector, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 14.

TABLE 14

| $\alpha_D=$ | $RV_1$ | $RV_2$ | $RV_3$ | $RV_4$ | $RV_5$ | $RV_6$ |
|---|---|---|---|---|---|---|
| $HV_1$ | $\delta_{HV}-\delta_{RV}$ | 0 | 0 | 0 | 0 | $\delta_{HV}-\delta_{RV}+2\pi$ |
| $HV_2$ | $\delta_{HV}-\delta_{RV}$ | $\delta_{HV}-\delta_{RV}$ | 0 | 0 | 0 | $\delta_{HV}-\delta_{RV}+2\pi$ |
| $HV_3$ | 0 | 0 | $-(\delta_{HV}-\delta_{RV})$ | $-(\delta_{HV}-\delta_{RV})$ | $-(\delta_{HV}-\delta_{RV})$ | 0 |
| $HV_4$ | 0 | 0 | 0 | $-(\delta_{HV}-\delta_{RV})$ | $-(\delta_{HV}-\delta_{RV})$ | 0 |
| $HV_5$ | 0 | 0 | 0 | 0 | $-(\delta_{HV}-\delta_{RV})$ | 0 |
| $HV_6$ | 0 | 0 | 0 | 0 | 0 | $\delta_{HV}-\delta_{RV}$ |

In FIG. 8, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 9 is a diagram of identifying inter-vehicle state information including a geodesic for a third orientation sector. Identifying inter-vehicle state information including a geodesic for a third orientation sector may be similar to the identification shown in FIG. 5, except as described herein. In the third orientation sector $Q_3$ the remote vehicle, and the geodesic, is located to the southwest of the host vehicle in the geospatial domain.

As shown in FIG. 9, for the third orientation sector, some embodiments include determining a host vehicle region for the host vehicle. A first host vehicle region may include host vehicle heading angles $\delta_{HV}$ from the reference direction, which may correspond with north, to a difference of the convergence angle $\beta_1$ of the geodesic and 180 degrees $\pi$, which may be expressed as $0<=\delta_{HV}<\beta_1-\pi$. A second host vehicle region may include host vehicle heading angles $\delta_{HV}$ from the difference of the convergence angle $\beta_1$ of the geodesic and 180 degrees to ninety degrees, which may correspond with east, and which may be expressed as $\beta_1-\pi<=\delta_{HV}<\pi/2$. A third host vehicle region may include host vehicle heading angles $\delta_{HV}$ from ninety degrees to 180 degrees, which may correspond with south, and which may be expressed as $\pi/2<=\delta_{HV}<\pi$. A fourth host vehicle region may include host vehicle heading angles $\delta_{HV}$ from 180 degrees to the convergence angle $\beta_1$ of the geodesic, which may be expressed as $\pi<=\delta_{HV}<\beta_1$. A fifth host vehicle region may include host vehicle heading angles $\delta_{HV}$ from the convergence angle $\beta_1$ of the geodesic, to 270 degrees, which may correspond with west, and which may be expressed as $\beta_1<=\delta_{HV}<3\pi/2$. A sixth host vehicle region may include host vehicle heading angles $\delta_{HV}$ from 270 degrees to 360 degrees, which may correspond with the reference direction, north, and which may be expressed as $3\pi/2<=\delta_{HV}<2\pi$.

As shown in FIG. 9, for the third orientation sector, some embodiments include determining a remote vehicle region for the remote vehicle. A first remote vehicle region may include remote vehicle heading angles $\delta_{RV}$ from the reference direction, which may correspond with north, to a difference of the convergence angle $\beta_1$ of the geodesic and 180 degrees $\pi$, which may be expressed as $0<=\delta_{RV}<\beta_1-\pi$. A second remote vehicle region may include remote vehicle heading angles $\delta_{RV}$ from the difference of the convergence angle $\beta_1$ of the geodesic and 180 degrees $\pi$ to ninety degrees, which may correspond with east, and which may be expressed as $\beta_1-\pi<=\delta_{RV}<\pi/2$. A third remote vehicle region may include remote vehicle heading angles $\delta_{RV}$ from ninety degrees to 180 degrees, which may correspond with south, and which may be expressed as $\pi/2<=\delta_{RV}<\pi$. A fourth remote vehicle region may include remote vehicle heading angles $\delta_{RV}$ from 180 degrees to the convergence angle $\beta_1$ of the geodesic, which may be expressed as $\pi<=\delta_{RV}<\beta_1$. A fifth remote vehicle region may include remote vehicle heading angles $\delta_{RV}$ from the convergence angle $\beta_1$ of the geodesic, to 270 degrees, which may correspond with west, and which may be expressed as $\beta_1 <= \delta_{RV} < 3\pi/2$. A sixth remote vehicle region may include remote vehicle heading angles $\delta_{RV}$ from 270 degrees to 360 degrees, which may correspond with the reference direction, north, and which may be expressed as $3\pi/2 <= \delta_{RV} < 2\pi$.

FIG. 10 is a diagram of identifying inter-vehicle state information including convergence information for the third orientation sector. Identifying inter-vehicle state information including a geodesic for the third orientation sector may be similar to the identification shown in FIG. 6, except as described herein.

Some embodiments include identifying, for the third orientation sector $Q_3$, a host vehicle expected path 10000 for the host vehicle (HV), respective remote vehicle expected paths 10100 for one or more of the remote vehicles (RV), or respective expected paths 10000/10100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent, which may indicate that the host vehicle expected path and the respective remote vehicle expected path intersect.

In some embodiments for the third orientation sector $Q_3$, determining whether the remote vehicle expected path and the host vehicle expected path are convergent may include examining defined convergence data, such as the defined convergence data shown in Table 15.

TABLE 15

|        | $RV_1$ | $RV_2$ | $RV_3$ | $RV_4$ | $RV_5$ | $RV_6$ |
|--------|--------|--------|--------|--------|--------|--------|
| $HV_1$ | $\eta_{RV}$ | 0 | 0 | 0 | 0 | 0 |
| $HV_2$ | 0 | $\eta_{HV}$ | 0 | 0 | 0 | 0 |
| $HV_3$ | 0 | 1 | $\eta_{HV}$ | 0 | 0 | 0 |
| $HV_4$ | 0 | 1 | 1 | $\eta_{HV}$ | 0 | 0 |
| $HV_5$ | 1 | 0 | 0 | 0 | $\eta_{RV}$ | 1 |
| $HV_6$ | 1 | 0 | 0 | 0 | 0 | $\eta_{RV}$ |

In some embodiments, for the third orientation sector $Q_3$, determining $\eta_{HV}$ may be expressed as shown in Equation 3. In some embodiments, determining $\eta_{RV}$ may be expressed as shown in Equation 4.

In some embodiments, for the third orientation sector $Q_3$, a combination ($F_{m,n}$) of the host vehicle heading angle $\delta_{HV}$ and the remote vehicle heading angle $\delta_{RV}$ may be expressed as shown in Tables 16-18.

TABLE 16

| $F_{m,n}$ | $RV_1$ | $RV_2$ | $RV_3$ | $RV_4$ | $RV_5$ | $RV_6$ |
|-----------|--------|--------|--------|--------|--------|--------|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 17

| $H_1$ | $\frac{1}{4}\left[\frac{\delta_{HV} - 0 - \sigma}{|\delta_{HV} - 0| + \sigma} + 1\right] \times \left[\frac{\beta_1 - \pi - \delta_{HV} - \sigma}{|\beta_1 - \pi - \delta_{HV}| + \sigma} + 1\right]$ |
| $H_2$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\frac{\pi}{2} - \delta_{HV} - \sigma}{|\frac{\pi}{2} - \delta_{HV}| + \sigma} + 1\right]$ |
| $H_3$ | $\frac{1}{4}\left[\frac{\delta_{HV} - \frac{\pi}{2} - \sigma}{|\delta_{HV} - \frac{\pi}{2}| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\beta_1 - \delta_{HV} - \sigma}{|\beta_1 - \delta_{HV}| + \sigma} + 1\right]$ |
| $H_5$ | $\frac{1}{4}\left[\frac{\delta_{HV} - \beta_1 - \sigma}{|\delta_{HV} - \beta_1| + \sigma} + 1\right] \times \left[\frac{\frac{3\pi}{2} - \delta_{HV} - \sigma}{|\frac{3\pi}{2} - \delta_{HV}| + \sigma} + 1\right]$ |
| $H_6$ | $\frac{1}{4}\left[\frac{\delta_{HV} - \frac{3\pi}{2} - \sigma}{|\delta_{HV} - \frac{3\pi}{2}| + \sigma} + 1\right] \times \left[\frac{2\pi - \delta_{HV} - \sigma}{|2\pi - \delta_{HV}| + \sigma} + 1\right]$ |

TABLE 18

| $R_1$ | $\frac{1}{4}\left[\frac{\delta_{RV} - 0 - \sigma}{|\delta_{RV} - 0| + \sigma} + 1\right] \times \left[\frac{\beta_1 + \pi - \delta_{RV} - \sigma}{|\beta_1 - \pi - \delta_{RV}| + \sigma} + 1\right]$ |
| $R_2$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\frac{\pi}{2} - \delta_{RV} - \sigma}{|\frac{\pi}{2} - \delta_{RV}| + \sigma} + 1\right]$ |
| $R_3$ | $\frac{1}{4}\left[\frac{\delta_{RV} - \frac{\pi}{2} - \sigma}{|\delta_{RV} - \frac{\pi}{2}| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\beta_1 - \delta_{RV} - \sigma}{|\beta_1 - \delta_{RV}| + \sigma} + 1\right]$ |
| $R_5$ | $\frac{1}{4}\left[\frac{\delta_{RV} - \beta_1 - \sigma}{|\delta_{RV} - \beta_1| + \sigma} + 1\right] \times \left[\frac{\frac{3\pi}{2} - \delta_{RV} - \sigma}{|\frac{3\pi}{2} - \delta_{RV}| + \sigma} + 1\right]$ |
| $R_6$ | $\frac{1}{4}\left[\frac{\delta_{RV} - \frac{3\pi}{2} - \sigma}{|\delta_{RV} - \frac{3\pi}{2}| + \sigma} + 1\right] \times \left[\frac{2\pi - \delta_{RV} - \sigma}{|2\pi - \delta_{RV}| + \sigma} + 1\right]$ |

Some embodiments may include, for the third orientation sector $Q_3$, determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 19.

TABLE 19

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ |
| $HV_2$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_3$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_4$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_5$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_6$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |

Some embodiments may include, for the third orientation sector $Q_3$, determining a remote vehicle approach $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 20.

TABLE 20

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV}-\beta_1+\pi)$ | 0 | 0 | 0 | 0 | 0 |
| $HV_2$ | 0 | $\delta_{RV}-\beta_1+\pi$ | 0 | 0 | 0 | 0 |
| $HV_3$ | 0 | $\delta_{RV}-\beta_1+\pi$ | $\delta_{RV}-\beta_1+\pi$ | 0 | 0 | 0 |
| $HV_4$ | 0 | $\delta_{RV}-\beta_1+\pi$ | $\delta_{RV}-\beta_1+\pi$ | $\delta_{RV}-\beta_1+\pi$ | 0 | 0 |
| $HV_5$ | $-(\delta_{RV}-\beta_1+\pi)$ | 0 | 0 | 0 | $-(\delta_{RV}-\beta_1-\pi)$ | $-(\delta_{RV}-\beta_1-\pi)$ |
| $HV_6$ | $-(\delta_{RV}-\beta_1+\pi)$ | 0 | 0 | 0 | 0 | $-(\delta_{RV}-\beta_1-\pi)$ |

Some embodiments include determining, for the third orientation sector $Q_3$, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 21.

TABLE 21

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\delta_{RV})$ | 0 | 0 | 0 | 0 | 0 |
| $HV_2$ | 0 | $\delta_{HV}-\delta_{RV}$ | 0 | 0 | 0 | 0 |
| $HV_3$ | 0 | $\delta_{HV}-\delta_{RV}$ | $\delta_{HV}-\delta_{RV}$ | 0 | 0 | 0 |
| $HV_4$ | 0 | $\delta_{HV}-\delta_{RV}$ | $\delta_{HV}-\delta_{RV}$ | $\delta_{HV}-\delta_{RV}$ | 0 | 0 |
| $HV_5$ | $2\pi-(\delta_{HV}-\delta_{RV})$ | 0 | 0 | 0 | $-(\delta_{HV}-\delta_{RV})$ | $-(\delta_{HV}-\delta_{RV})$ |
| $HV_6$ | $2\pi-(\delta_{HV}-\delta_{RV})$ | 0 | 0 | 0 | 0 | $-(\delta_{HV}-\delta_{RV})$ |

In FIG. 10, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 11 is a diagram of identifying inter-vehicle state information including a geodesic for a fourth orientation sector. Identifying inter-vehicle state information including a geodesic for a fourth orientation sector may be similar to the identification shown in FIG. 5, except as described herein. In the fourth orientation sector $Q_4$ the remote vehicle, and the geodesic, is located to the northwest of the host vehicle in the geospatial domain.

Some embodiments include determining, as shown in FIG. 11, for the fourth orientation sector $Q_4$, a host vehicle region for the host vehicle. A first host vehicle region may include host vehicle heading angles $\delta_{HV}$ from the reference direction, which may correspond with north, to ninety degrees, which may correspond with east, and which may be expressed as $0<=\delta_{HV}<\pi/2$. A second host vehicle region may include host vehicle heading angles $\delta_{HV}$ from ninety degrees to a difference of the convergence angle $\beta_1$ of the geodesic and 180 degrees $\pi$, which may be expressed as $\pi/2<=\delta_{HV}<\beta_1-\pi$. A third host vehicle region may include host vehicle heading angles $\delta_{HV}$ from the difference of the convergence angle $\beta_1$ of the geodesic and 180 degrees $\pi$ to 180 degrees, which may correspond with south, and which may be expressed as $\beta_1-\pi<=\delta_{HV}<\pi$. A fourth host vehicle region may include host vehicle heading angles $\delta_{HV}$ from 180 degrees to 270 degrees, which may correspond with west, and which may be expressed as $\pi<=\delta_{HV}<3\pi/2$. A fifth host vehicle region may include host vehicle heading angles $\delta_{HV}$ from 270 degrees to the convergence angle $\beta_1$ of the geodesic, which may be expressed as $3\pi/2<=\delta_{HV}<\beta_1$. A sixth host vehicle region may include host vehicle heading angles $\delta_{HV}$ from the convergence angle $\beta_1$ of the geodesic to 360 degrees, which may correspond with the reference direction, north, and which may be expressed as $\beta_1<=\delta_{HV}<2\pi$.

Some embodiments include determining, as shown in FIG. 11, for the fourth orientation sector, a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0<=\delta_{RV}<\pi/2$. A second remote vehicle region may include remote vehicle heading angles $\delta_{RV}$ from ninety degrees to a difference of the convergence angle $\beta_1$ of the geodesic and 180 degrees $\pi$, which may be expressed as $\pi/2<=\delta_{RV}<\beta_1-\pi$. A third remote vehicle region may include remote vehicle heading angles $\delta_{RV}$ from the difference of the convergence angle $\beta_1$ of the geodesic and 180 degrees $\pi$ to 180 degrees, which may correspond with south, and which may be expressed as $\beta_1-\pi<=\delta_{RV}<\pi$. A fourth remote vehicle region may include remote vehicle heading angles $\delta_{RV}$ from 180 degrees to 270 degrees, which may correspond with west, and which may be expressed as $\pi<=\delta_{RV}<3\pi/2$. A fifth remote vehicle region may include remote vehicle heading angles $\delta_{RV}$ from 270 degrees to the convergence angle $\beta_1$ of the geodesic, which may be expressed as $3\pi/2 <= \delta_{RV}\beta_1$. A sixth remote vehicle region may include remote vehicle heading angles $\delta_{RV}$ from the convergence angle $\beta_1$ of the geodesic to 360 degrees, which may correspond with the reference direction, north, and which may be expressed as $\beta_1 <= \delta_{RV} < 2\pi$.

FIG. 12 is a diagram of identifying inter-vehicle state information including convergence information for the fourth orientation sector. Identifying inter-vehicle state information including a geodesic for a fourth orientation sector may be similar to the identification shown in FIG. 6, except as described herein.

Some embodiments include identifying, for the fourth orientation sector $Q_4$, a host vehicle expected path 12000 for the host vehicle (HV), respective remote vehicle expected paths 12100 for one or more of the remote vehicles (RV), or respective expected paths 12000/12100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent, which may indicate that the host vehicle expected path and the respective remote vehicle expected path intersect.

In some embodiments, for the fourth orientation sector $Q_4$, determining whether the remote vehicle expected path and the host vehicle expected path are convergent may include examining defined convergence data, such as the defined convergence data shown in Table 22.

TABLE 22

| | $RV_1$ | $RV_2$ | $RV_3$ | $RV_4$ | $RV_5$ | $RV_6$ |
|---|---|---|---|---|---|---|
| $HV_1$ | $\eta_{RV}$ | 1 | 0 | 0 | 0 | 0 |
| $HV_2$ | 0 | $\eta_{RV}$ | 0 | 0 | 0 | 0 |
| $HV_3$ | 0 | 0 | $\eta_{HV}$ | 0 | 0 | 0 |
| $HV_4$ | 0 | 0 | 1 | $\eta_{HV}$ | 0 | 0 |
| $HV_5$ | 0 | 0 | 1 | 1 | $\eta_{HV}$ | 0 |
| $HV_6$ | 1 | 1 | 0 | 0 | 1 | $\eta_{RV}$ |

In some embodiments, determining $\eta_{HV}$ may be expressed as shown in Equation 3. In some embodiments, determining $\eta_{RV}$ may be expressed as shown in Equation 4.

In some embodiments, for the fourth orientation sector $Q_4$, a combination ($F_{m,n}$) of the host vehicle heading angle $\delta_{HV}$ and the remote vehicle heading angle $\delta_{RV}$ may be expressed as shown in Tables 23-25.

TABLE 23

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 24

| | |
|---|---|
| $H_1$ | $\frac{1}{4}\left[\frac{\delta_{HV} - 0 - \sigma}{|\delta_{HV} - 0| + \sigma} + 1\right] \times \left[\frac{\frac{\pi}{2} - \delta_{HV} - \sigma}{|\frac{\pi}{2} - \delta_{HV}| + \sigma} + 1\right]$ |
| $H_2$ | $\frac{1}{4}\left[\frac{\delta_{HV} - \frac{\pi}{2} - \sigma}{|\delta_{HV} - \frac{\pi}{2}| + \sigma} + 1\right] \times \left[\frac{(\beta_1 - \pi) - \delta_{HV} - \sigma}{|(\beta_1 - \pi) - \delta_{HV}| + \sigma} + 1\right]$ |
| $H_3$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{|\frac{3\pi}{2} - \delta_{HV}| + \sigma} + 1\right]$ |
| $H_5$ | $\frac{1}{4}\left[\frac{\delta_{HV} - \frac{3\pi}{2} - \sigma}{|\delta_{HV} - \frac{3\pi}{2}| + \sigma} + 1\right] \times \left[\frac{\beta_1 - \delta_{HV} - \sigma}{|\beta_1 - \delta_{HV}| + \sigma} + 1\right]$ |
| $H_6$ | $\frac{1}{4}\left[\frac{\delta_{HV} - \beta_1 - \sigma}{|\delta_{HV} - \beta_1| + \sigma} + 1\right] \times \left[\frac{2\pi - \delta_{HV} - \sigma}{|2\pi - \delta_{HV}| + \sigma} + 1\right]$ |

TABLE 25

| | |
|---|---|
| $R_1$ | $\frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{|\frac{\pi}{2} - \delta_{RV}| + \sigma} + 1\right]$ |
| $R_2$ | $\frac{1}{4}\left[\frac{\delta_{RV} - \frac{\pi}{2} - \sigma}{|\delta_{RV} - \frac{\pi}{2}| + \sigma} + 1\right] \times \left[\frac{(\beta_1 - \pi) - \delta_{RV} - \sigma}{|(\beta_1 - \pi) - \delta_{RV}| + \sigma} + 1\right]$ |
| $R_3$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{|\frac{3\pi}{2} - \delta_{RV}| + \sigma} + 1\right]$ |
| $R_5$ | $\frac{1}{4}\left[\frac{\delta_{RV} - \frac{3\pi}{2} - \sigma}{|\delta_{RV} - \frac{3\pi}{2}| + \sigma} + 1\right] \times \left[\frac{\beta_1 - \delta_{RV} - \sigma}{|\beta_1 - \delta_{RV}| + \sigma} + 1\right]$ |
| $R_6$ | $\frac{1}{4}\left[\frac{\delta_{RV} - \beta_1 - \sigma}{|\delta_{RV} - \beta_1| + \sigma} + 1\right] \times \left[\frac{2\pi - \delta_{RV} - \sigma}{|2\pi - \delta_{RV}| + \sigma} + 1\right]$ |

Some embodiments may include determining, for the fourth orientation sector $Q_4$, a host vehicle approach $\alpha_{RV}$ for the host vehicle based on the host vehicle region $HV_n$, the remote vehicle region $RV_n$, the host vehicle heading angle $\delta_{HV}$, and the convergence angle $\beta_1$, as expressed in Table 26.

TABLE 26

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_4$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_5$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_6$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |

Some embodiments, for the fourth orientation sector $Q_4$, may include determining a remote vehicle approach $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 27.

TABLE 27

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV} - \beta_1 + \pi)$ | $-(\delta_{RV} - \beta_1 + \pi)$ | 0 | 0 | 0 | 0 |
| $HV_2$ | 0 | $-(\delta_{RV} - \beta_1 + \pi)$ | 0 | 0 | 0 | 0 |
| $HV_3$ | 0 | 0 | $\delta_{RV} - \beta_1 + \pi$ | 0 | 0 | 0 |
| $HV_4$ | 0 | 0 | $\delta_{RV} - \beta_1 + \pi$ | $\delta_{RV} - \beta_1 + \pi$ | 0 | 0 |
| $HV_5$ | 0 | 0 | $\delta_{RV} - \beta_1 + \pi$ | $\delta_{RV} - \beta_1 + \pi$ | $\delta_{RV} - \beta_1 + \pi$ | 0 |
| $HV_6$ | $-(\delta_{RV} - \beta_1 + \pi)$ | $-(\delta_{RV} - \beta_1 + \pi)$ | 0 | 0 | 0 | $-(\delta_{RV} - \beta_1 - \pi)$ |

Some embodiments, for the fourth orientation sector $Q_4$, may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 28.

TABLE 28

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \delta_{RV})$ | $-(\delta_{HV} - \delta_{RV})$ | 0 | 0 | 0 | 0 |
| $HV_2$ | 0 | $-(\delta_{HV} - \delta_{RV})$ | 0 | 0 | 0 | 0 |
| $HV_3$ | 0 | 0 | $\delta_{HV} - \delta_{RV}$ | 0 | 0 | 0 |
| $HV_4$ | 0 | 0 | $\delta_{HV} - \delta_{RV}$ | $\delta_{HV} - \delta_{RV}$ | 0 | 0 |
| $HV_5$ | 0 | 0 | $\delta_{HV} - \delta_{RV}$ | $\delta_{HV} - \delta_{RV}$ | $\delta_{HV} - \delta_{RV}$ | 0 |
| $HV_6$ | $2\pi + (\delta_{HV} - \delta_{RV})$ | $2\pi + (\delta_{HV} - \delta_{RV})$ | 0 | 0 | 0 | $-(\delta_{HV} - \delta_{RV})$ |

In FIG. 12, $L_{HV}$ indicates a distance from the host vehicle to the projected point of convergence with the remote vehicle expected path, and $L_{RV}$ indicates a distance from the remote vehicle to the projected point of convergence with the host vehicle expected path.

In some embodiments, determining the host vehicle approach angle $\alpha_{HV}$, the remote vehicle approach angle $\alpha_{RV}$, and the intersection angle $\alpha_D$ for any combination of orientation sector, host vehicle region, and remote vehicle region may be expressed as the in Equations 5-11:

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\phi_{RV} - \phi_{HV} - \sigma}{|\phi_{RV} - \phi_{HV}| + \sigma} + 1\right].$$ [Equation 5]

$$Q_2 = \frac{1}{4}\left[\frac{\phi_{HV} - \phi_{RV} - \sigma}{|\phi_{RV} - \phi_{HV}| + \sigma} + 1\right] \times \left[\frac{\phi_{RV} - \phi_{HV} - \sigma}{|\phi_{RV} - \phi_{HV}| + \sigma} + 1\right].$$ [Equation 6]

$$Q_3 = \frac{1}{4}\left[\frac{\phi_{HV} - \phi_{RV} - \sigma}{|\phi_{RV} - \phi_{HV}| + \sigma} + 1\right] \times \left[\frac{\phi_{RV} - \phi_{HV} - \sigma}{|\phi_{RV} - \phi_{HV}| + \sigma} + 1\right].$$ [Equation 7]

$$Q_4 = \frac{1}{4}\left[\frac{\phi_{RV} - \phi_{HV} - \sigma}{|\phi_{RV} - \phi_{HV}| + \sigma} + 1\right] \times \left[\frac{\phi_{HV} - \phi_{RV} - \sigma}{|\phi_{RV} - \phi_{HV}| + \sigma} + 1\right].$$ [Equation 8]

$$\alpha_{HV} = Q_1 \sum_{m=1}^{6}\sum_{n=1}^{6} F\eta\alpha_{HV} + Q_2 \sum_{m=1}^{6}\sum_{n=1}^{6} F\eta\alpha_{HV} +$$ [Equation 9]

$$Q_3 \sum_{m=1}^{6}\sum_{n=1}^{6} F\eta\alpha_{HV} + Q_4 \sum_{m=1}^{6}\sum_{n=1}^{6} F\eta\alpha_{HV}.$$

$$\alpha_{RV} = Q_1 \sum_{m=1}^{6}\sum_{n=1}^{6} F\eta\alpha_{RV} + Q_2 \sum_{m=1}^{6}\sum_{n=1}^{6} F\eta\alpha_{RV} +$$ [Equation 10]

$$Q_3 \sum_{m=1}^{6}\sum_{n=1}^{6} F\eta\alpha_{RV} + Q_4 \sum_{m=1}^{6}\sum_{n=1}^{6} F\eta\alpha_{RV}.$$

$$\alpha_D = Q_1 \sum_{m=1}^{6}\sum_{n=1}^{6} F\eta\alpha_D + Q_2 \sum_{m=1}^{6}\sum_{n=1}^{6} F\eta\alpha_D +$$ [Equation 11]

$$Q_3 \sum_{m=1}^{6}\sum_{n=1}^{6} F\eta\alpha_D + Q_4 \sum_{m=1}^{6}\sum_{n=1}^{6} F\eta\alpha_D.$$

For simplicity and clarity, some notation has been omitted from Equations 9-11. For example, the portion $F\eta\alpha_{HV}$ at the right hand side of Equation 9 may be more expansively recited as follows: $F_{4_{m,n}}\eta_{4_{m,n}}\alpha_{HV4_{m,n}}$.

In some embodiments, the distance from the host vehicle to the intersection ($l_{HV}$) may be determined as shown in the following:

$$\frac{D}{\sin\alpha_D} = \frac{l_{HV}}{\sin\alpha_{RV}} = \frac{l_{RV}}{\sin\alpha_{HV}};$$ [Equation 12]

$$l_{HV} = D\frac{\sin\alpha_{RV}}{\sin\alpha_D}.$$

Similarly, the distance from the remote vehicle to the intersection ($l_{RV}$) may be determined as shown in the following:

$$\frac{D}{\sin\alpha_D} = \frac{l_{HV}}{\sin\alpha_{RV}} = \frac{l_{RV}}{\sin\alpha_{HV}};$$ [Equation 13]

$$l_{RV} = D\frac{\sin\alpha_{HV}}{\sin\alpha_D}.$$

Although FIGS. 5-12 show examples of vehicles traveling along straight paths, curved paths or turning paths can be used.

Figure 13:
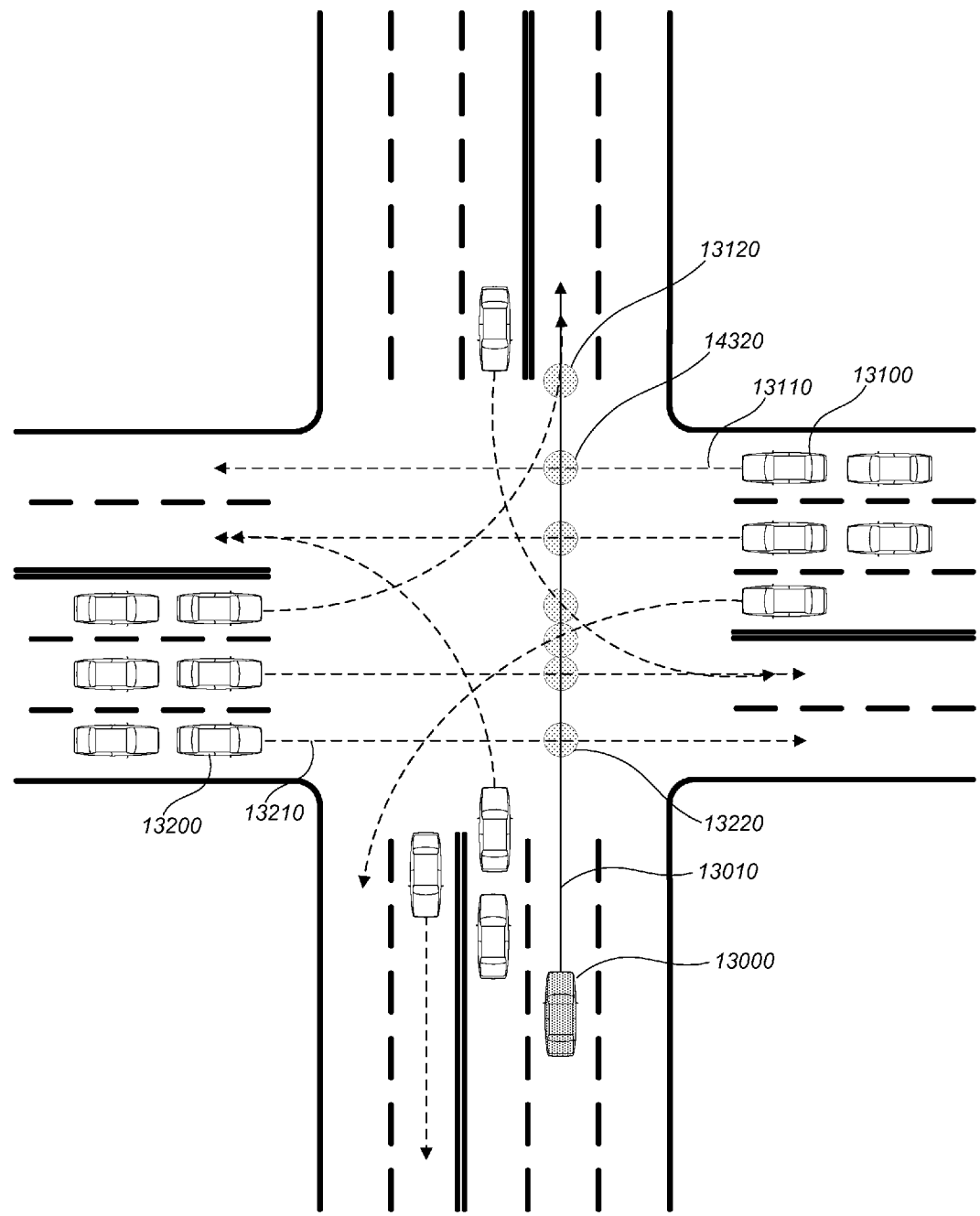
FIG. 13 is a diagram of identifying converging paths.

FIG. 13 is a diagram of identifying converging paths. Identifying converging paths may be implemented in a vehicle, such as the vehicle 1000 shown in FIG. 1 or the vehicles 2100/2110 shown in FIG. 2.

In some embodiments, a host vehicle 13000 may traverse a portion of a vehicle transportation network. The host vehicle may receive remote vehicle messages from multiple remote vehicles 13100/13200 within a defined reception range, identify a host vehicle expected path 13010 for the host vehicle, and identify remote vehicle expected paths 13110/13210 the remote vehicles 13100/13200. In some embodiments, the host vehicle 13000 may determine that one or more of the remote vehicle expected paths 13110/13210 are convergent with the host vehicle expected path 13010. In some embodiments, the host vehicle 13000 may identify a respective expected point of convergence 13120/13220, for one or more of the convergent remote vehicle expected paths 13110/13210.

The converging path methodology described above can be applied to identify situations in which certain messages may be occluded based on the presence and/or trajectory of nearby vehicles. The methods described herein can be applied using one or more vehicles that are configured as described with respect to the vehicle 1000, and which communicate via messages such as basic safety messages, as described with respect to the vehicles 2100/2110. A vehicle warning system (also referred to as an information system) can be implemented in a vehicle, such as the vehicle 1000, that includes a wireless electronic communication device, one or more sensors, an output system including at least one of an audio output device or a visual output device. The vehicle warning system can be operable to execute instructions that cause the vehicle warning system to output message occlusion alerts as will be described further herein.

Figure 14:
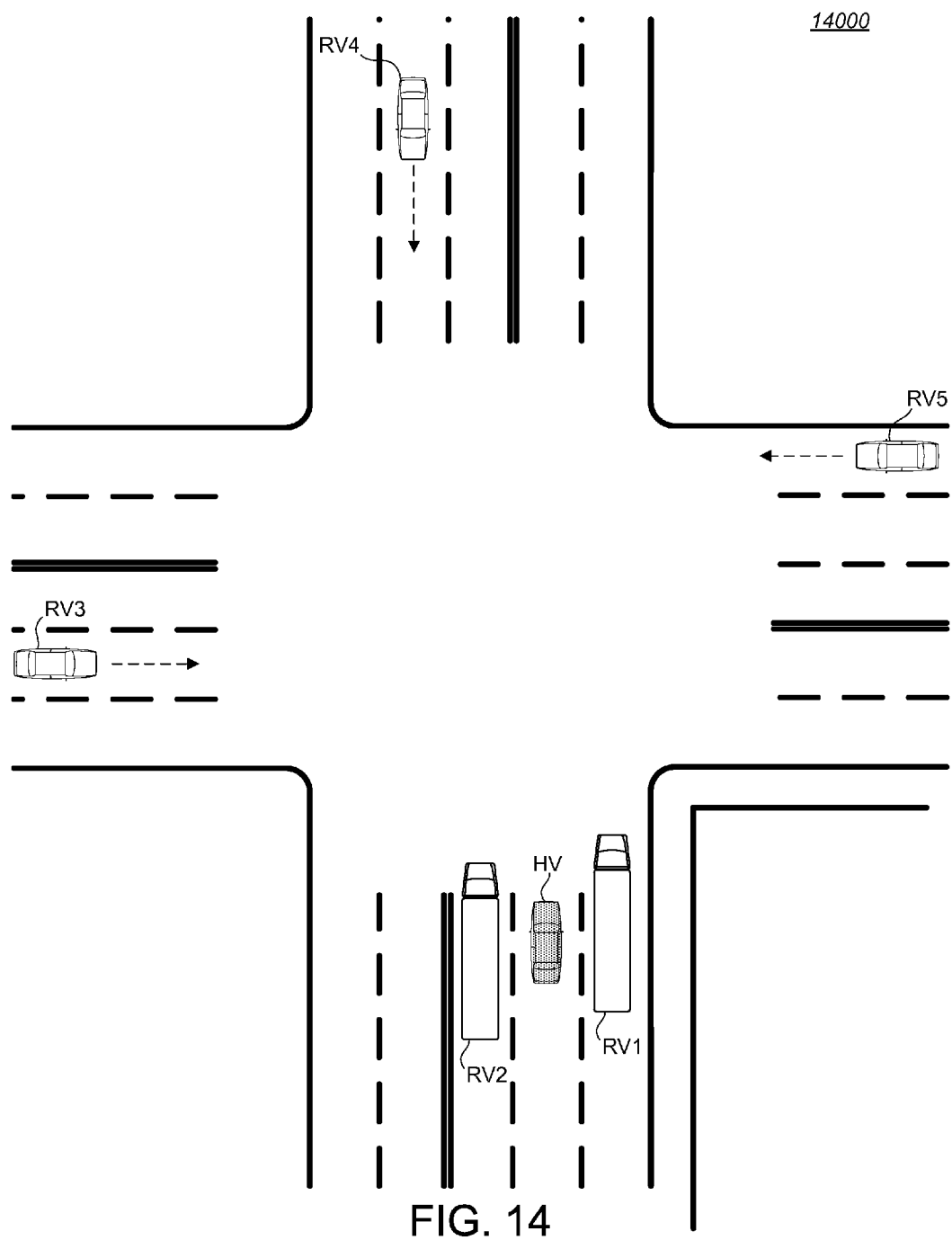
FIG. 14 shows a first scenario in which messages are occluded by one or more remote vehicles.

FIG. 14 shows a scenario 14000 according to a first example in which a host vehicle HV is stopped at a northbound approach of an intersection. In this example, the northbound approach has multiple lanes, and the host vehicle HV is positioned within one of the central lanes of the northbound approach. A first remote vehicle RV1 is also stopped at the northbound approach of the intersection, and is positioned adjacent to the host vehicle HV in a lane to the right of the host vehicle HV. A second remote vehicle RV2 is also stopped at the northbound approach of the intersection and is positioned adjacent to the host vehicle HV in a lane to the left of the host vehicle HV. Several other vehicles are approaching the intersection. A third remote vehicle RV3 is approaching the intersection and is traveling eastbound. A fourth remote vehicle RV4 is approaching the intersection and is traveling southbound. A fifth remote vehicle RV5 is approaching the intersection and is traveling westbound.

The host vehicle HV able to send messages to all vehicles in the vicinity, such as in the form of basic safety messages as previously described. These messages can include information that describes at least the geospatial state and the kinematic state of the vehicle. As an example, the geospatial state information can include GPS position, and heading. The kinematic state information can include speed, acceleration, and yaw rate.

The host vehicle HV is also operable to receive messages from vehicles in the vicinity, such as from the first remote vehicle RV1, the second remote vehicle RV2, the third remote vehicle RV3, the third remote vehicle RV3, the fourth remote vehicle RV4, and the fifth remote vehicle RV5. These messages can be equivalent to the messages that are broadcast by the host vehicle HV, and can likewise include at least information describing at least the geospatial state and the kinematic state of the respective vehicle.

The messages broadcast by and received by the host vehicle HV can also include information that describes vehicle size. The information can include, as examples, vehicle length, vehicle width, and vehicle height. For example, Society of Automotive Engineers specification no. SAE J2735 describes data elements corresponding to vehicle length, vehicle width, and vehicle height, namely DE_VehicleLength, DE_VehicleWidth and DE_VehicleType. DE_VehicleLength describes the length of a vehicle as a value between 0 and 16383 cm. DE_VehicleWidth describes the width of a vehicle as a value between 0 and 1023 cm. DE_VehicleType is a hexadecimal value between 0 and F, with each value corresponding to a different types of vehicle, such as motorcycles, passenger cars, buses, and various configurations of multi-axle, multi-trailer vehicles.

Using the messages that received from the remote vehicles, the host vehicle HV is able to determine whether messages are being occluded. As will be explained in detail, when the host vehicle HV determines that a remote vehicle is located adjacent to the host vehicle HV, the host vehicle HV analyzes the information received from the adjacent remote vehicle to determine whether messages from other remote vehicles may be occluded by the adjacent remote vehicle. The determination is made, at least in part, by analyzing information that describes a vehicle size for the adjacent remote vehicle. The information describing vehicle size can indicate a vehicle type, such as the DE_VehicleType value, or can describe a dimension of the adjacent remote vehicle, such as the DE_VehicleLength or DE_VehicleWidth values, or can describe any other feature of the adjacent remote vehicle that is indicative of size. This analysis can be performed, for example, by the controller 1300 of the vehicle 1000 by retrieving instructions that are stored at the memory 1340, and executing those instructions using the processor 1330. If the analysis performed by the host vehicle HV determines that an occlusion may exist, the host vehicle can output an occlusion alert, which is an audible or visible indication that is presented to the driver of the vehicle and indicates that the driver should exercise caution. The occlusion alert can be output, for example, using at least one of an audio output device or a visual output device that is associated with the user interface 1350 of the vehicle 1000.

In FIG. 14, the vehicle warning system of the host vehicle HV is receiving messages from the first remote vehicle RV1, the second remote vehicle RV2, and the fourth remote vehicle RV4. The first remote vehicle RV1 and the second remote vehicle RV2 are both large vehicles. In the illustrated example, the first remote vehicle RV1 and the second remote vehicle RV2 are semi-trailer trucks. The host vehicle HV is not receiving messages from the third remote vehicle RV3 or from the fifth remote vehicle RV5. In particular, transmission of messages to and receipt of messages from the third remote vehicle RV3 is occluded by presence of the second remote vehicle RV2 adjacent to the host vehicle HV, and transmission of messages to and receipt of messages from the fifth remote vehicle RV5 is occluded by presence of the first remote vehicle RV1 adjacent to the host vehicle HV. As a result, the vehicle warning system of the host vehicle HV is receiving no messages from the third remote vehicle RV3 or from the fifth remote vehicle RV5, and is not aware that these vehicles are present.

The host vehicle HV receives messages from one or more vehicles, such as the first remote vehicle RV1, the second remote vehicle RV2, and the fourth remote vehicle RV4. Each of these messages can be, for example, a basic safety message or a similar type of message. The messages each include remote vehicle information for the respective vehicle from which the message was broadcast. The remote vehicle information can include information that indicates geospatial state, kinematic state, and/or vehicle size for each of the one or more remote vehicles.

The messages can be sent and/or received via a wireless electronic communication link, such as the electronic communication interface 1370 of the vehicle 1000.

Using host vehicle information that is provided by the subsystems of the controller 1300, and the remote vehicle information provided by a subject remote vehicle, such as the first remote vehicle RV1 or the second remote vehicle RV2, the host vehicle determines a positional relationship of the host vehicle HV with respect to the subject remote vehicle. Each of the remote vehicles that the host vehicle HV is receiving messages from can be analyzed as the subject remote vehicle in turn.

The positional relationship of the host vehicle HV with respect to the subject remote vehicle can include the host vehicle heading angle $\delta_{HV}$, the remote vehicle heading angle $\delta_{RV}$, the convergence angle $\beta_1$, and the distance D along the geodesic defined between the host vehicle and the remote vehicle. The host vehicle heading angle $\delta_{HV}$, is determined by sensors or systems that are associated with the host vehicle, such as the controller 1300 and the location unit 1310. The remote vehicle heading angle $\delta_{RV}$, can be provided to the host vehicle HV in the information transmitted to the host vehicle HV from the subject remote vehicle in the messages. The convergence angle $\beta_1$ can be determined in the manner previously described in connection with Equation 1 based on the host vehicle information determined by the controller 1300 and its subsystems and based on the information received from the subject remote vehicle. The distance D can be determined in the manner previously described in connection with Equation 2 based on the host vehicle information determined by the controller 1300 and its subsystems and based on the information received from the subject remote vehicle.

Figure 15:
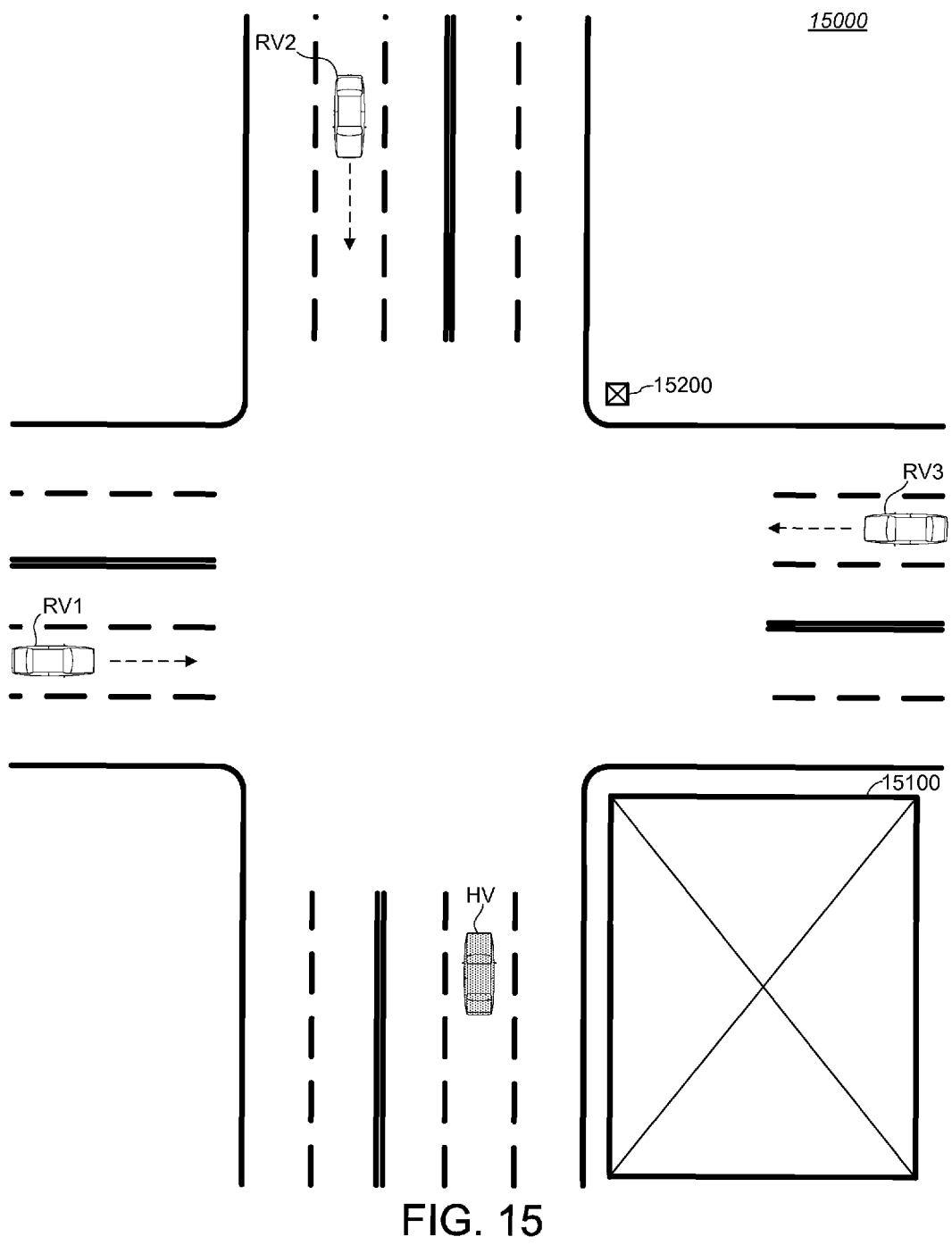
FIG. 15 shows a second scenario in which messages are occluded by a fixed object.

FIG. 15 shows a scenario 15000 according to a second example in which a host vehicle HV is stopped at a northbound approach of an intersection. A first remote vehicle RV1 is approaching the intersection and is traveling eastbound. A second remote vehicle RV2 is approaching the intersection and is traveling southbound. A third remote vehicle RV3 is approaching the intersection and is traveling westbound. A building 15100 is positioned adjacent to the intersection at the southeast corner of the intersection. The building 15100 is an example of a fixed object that can occlude messages between vehicles. In this example, the building 15100 may occlude messages broadcast by the third remote vehicle RV3 such that they are not received by the host vehicle HV. A stationary transmitter 15200 can be positioned in the vicinity of the intersection. The stationary transmitter 15200 is an example of an infrastructure device that can communication with the host vehicle HV and the remote vehicles via vehicle-to-infrastructure communications, using messages that are similar to the messages that are broadcast by the vehicles. For example, the information broadcast by the stationary transmitter 15200 can include the location of the stationary transmitter, information identifying known message occlusions in the vicinity of the stationary transmitter 15200 such as the building 15100, and information identifying the presence of vehicles near the stationary transmitter 15200, such as information identifying each vehicle that the stationary transmitter 15200 is currently receiving messages from.

Figure 16:
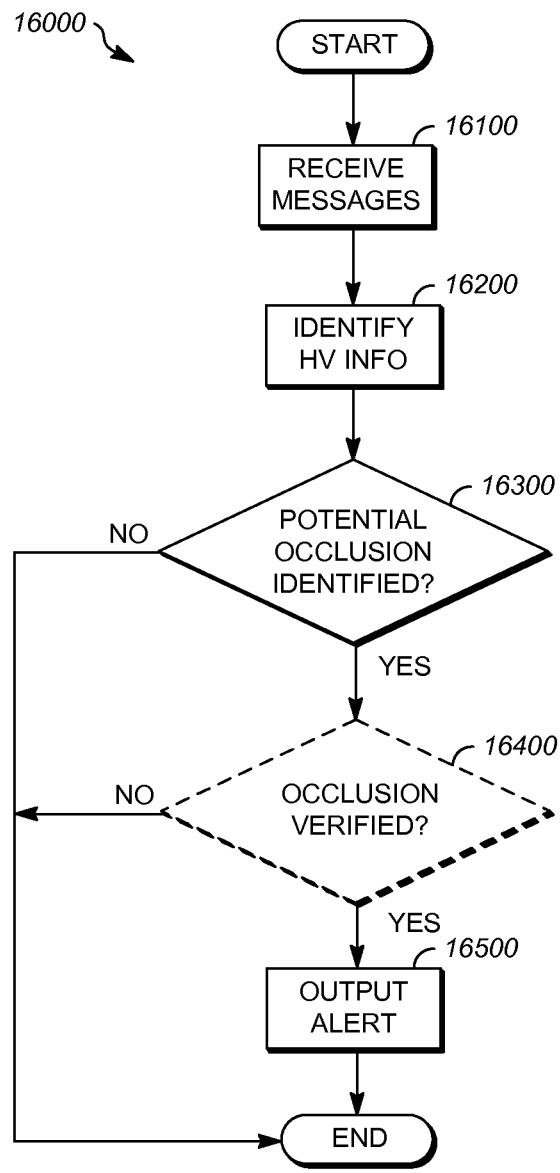
FIG. 16 is a flowchart that shows a message occlusion detection method according to a first example.

FIG. 16 is a flowchart that shows a message occlusion detection method 16000 according to a first example that can be implemented in a vehicle, such as the vehicle 1000 shown in FIG. 1 or the vehicles 2100/2110 shown in FIG. 2, in order to provide information to the driver of the vehicle regarding a potential message occlusion. As an example, the method can be performed by the controller 1300 of the vehicle 1000 by storing instructions at the memory 1340 that, when executed by the processor 1330 cause the message occlusion detection method 16000 to be performed including causing output of a message occlusion alert by the user interface 1350. The method 16000 can be performed during operation of the vehicle in any situation, including in the scenario 14000 of FIG. 14.

In operation 16100, the method 16000 includes receiving messages at a host vehicle, such as the host vehicle HV of FIG. 14. The messages can be received via a wireless electronic communication link, for example, using the communication unit 1320 and the communication interface 1370. The messages can be received from one or more remote vehicles and can each include remote vehicle information for a respective one of the remote vehicles. The remote vehicle information can be, for example, geospatial state information and kinematic state information. In some implementations the remote vehicle information also includes information identifying the presence of other remote vehicles. In some implementations, the messages can be received from a stationary transmitter in what is referred to as vehicle-to-infrastructure communication, as will be described further herein. Information received from a stationary transmitter can include, for example, information identifying a message occlusion such as a building, or information identifying the presence of remote vehicles. In some implementations the messages are basic safety messages, as previously described.

In operation 16200, host vehicle information is identified for the host vehicle. The host vehicle information can be, for example, geospatial state information and kinematic state information. Identifying host vehicle information includes any matter or means by which information can be received, obtained, accessed, calculated, or derived. The host vehicle information can be identified by, for example, receiving signals and/or data such as from sensors or systems that are associated with the host vehicle including the controller 1300 and the location unit 1310.

Operation 16300 includes determining that a potential message occlusion exists based at least in part on the remote vehicle information contained in the messages that were received in operation 16100. This determination can also be based on the host vehicle information identified in operation 16200. As one example, a potential message occlusion can be determined to exist based on presence of an object or vehicle near the host vehicle, such as within a threshold distance of the host vehicle. This determination can include consideration of a positional relationship of the host vehicle with respect to the potentially occluding vehicle or object. This determination can also include consideration of the timing and circumstances associated with receipt of some of the messages that were received in operation 16100. If in operation 16300 it is determined that a potential message occlusion exists, the process proceeds to operation 16400. If in operation 16300 it is determined that no potential message occlusion exists, the process ends.

Operation 16400 includes verifying existence of the potential message occlusion. Operation 16400 is optional. In operation 16400, an additional message occlusion strategy is utilized in addition to the strategy applied in operation 16300. The same types of detection strategies that can be applied in operation 16300 can also be applied in operation 16400. Thus, operation 16300 can include applying a first type of message occlusion detection strategy to determine whether a potential message occlusion exists, and operation 16400 can include applying a second type of message occlusion detection strategy to verify existence of the potential message occlusion, where the first type of message occlusion detection strategy is different than the second type of message occlusion detection strategy.

If existence of the potential message occlusion is verified in operation 16400, the process proceeds to operation 16500 it is determined that a potential message occlusion exists, the process proceeds to operation 16400. If in operation 16300 it is determined that no potential message occlusion exists, the process ends.

In operation 16500 a message occlusion alert is caused to be output. Operation 16500 can be performed in response the determination of operation 16300 that a potential message occlusion exists and/or in response to verification of existence of the potential message occlusion in operation 16400. As previously described, the message occlusion alert can be output by a visual or audible display device, such as one that is associated with the user interface 1350, in the form of an audible or visible indication that is presented to the driver of the vehicle and indicates that the driver should exercise caution.

In some implementations, the host vehicle HV uses the positional relationship between the host vehicle HV and a subject remote vehicle to determine that a potential message occlusion exists. As one example, the host vehicle can determine the distance D between the host vehicle and the subject remote vehicle and conclude that a potential message occlusion exists if the subject remote vehicle is located within a message occlusion threshold distance $D_T$, such as 5 meters or 10 meters. This determination can optionally also be based on heading angle and/or speed. Comparing the heading angles of the host vehicle HV and the subject remote vehicle shows whether the host vehicle HV and the subject remote vehicle are travelling in the same direction. For example, the host vehicle HV can determine whether a difference $\Delta\delta$ between the host vehicle heading angle $\delta_{HV}$ and the remote vehicle heading angle $\delta_{RV}$ is less than a threshold, where further analysis is not performed if the heading angles differ by more than the difference $\Delta\delta$. With respect to speed, a subject remote vehicle that is within the message occlusion threshold distance $D_T$ can be determined to not be a potential message occlusion if the speed of the subject remote vehicle is above a threshold speed.

In another implementation, determining the subject remote vehicle may be occluding transmission of messages is based in part on the size of the subject remote vehicle. In one implementation, any vehicle that is within the message occlusion threshold distance $D_T$ and has a size that is greater than a threshold size will trigger a message occlusion alert. If the vehicle size is based on information describing a vehicle type, certain values for the vehicle type can be considered to exceed the threshold size. Therefore, determining that a potential message occlusion exists can include determining that a vehicle size of the subject remote vehicle is greater than a threshold size, determining the distance D of the subject remote vehicle from the host vehicle HV, and determining that the distance D of the host vehicle HV from the subject remote vehicle is less than the message occlusion threshold distance $D_T$.

In some implementations, the message occlusion threshold distance $D_T$ is a predetermined value. In other implementations, the message occlusion threshold distance $D_T$ is determined based on remote vehicle information that describes the size of the subject remote vehicle. The occlusion limit threshold can be set using a formula or can be performed using stored data specifying a threshold value for each of a plurality of vehicle sizes. The stored data can be, for example, a lookup table. For example, if the vehicle size is based on information describing a vehicle type, each vehicle type can be associated with a specific value for the message occlusion threshold distance $D_T$ using a table or a similar method. If the vehicle size is based on information describing a measurement of the vehicle, such as length, certain lengths or ranges of lengths can be associated with respective values for the message occlusion threshold distance $D_T$, or a formula can be utilized to calculate the occlusion limit threshold based on a vehicle measurement or measurements.

In some implementations, determining that a potential message occlusion exists and/or verifying existence of the potential message occlusion is performed based on messages received at the host vehicle from more than one remote vehicle. As an example, if the size and location of a first remote vehicle is used as a basis for concluding that the first remote vehicle may be a message occluding object based on messages received from the first remote vehicle, messages received from a second remote vehicle can be used as a basis for verifying that a message occlusion exists.

In some implementations, determining that a potential message occlusion exists includes analyzing a timing or pattern of receipt of messages from one or more remote vehicles. In one example, the vehicle warning system identifies messages that are first received at a distance that is much closer than the typical broadcast range of the wireless communications systems used by the vehicles. For example, if the broadcast range is 300 meters and messages are first received from a remote vehicle (i.e. no prior messages have been received from the remote vehicle) at an initial message distance of 50 meters that is less than a threshold such as a limit distance $D_{Limit}$ of 70 meters, the vehicle warning system can determine that a potential message occlusion exists. Thus, determining that the potential message occlusion exists can include receiving an initial message from the remote vehicle when no prior messages have been received at the host vehicle from the remote vehicle; determining an initial message distance at which the initial message is received; and determining that the initial message distance is less than a limit distance. In this example the initial message distance is the distance of the remote vehicle from the host vehicle can be determined using the remote vehicle information contained in the message in conjunction with the host vehicle information, as explained with respect to Equation 2.

In another example of determining that a potential message occlusion exists by includes analyzing a timing or pattern of receipt of messages, the vehicle warning system can track messages received from an approaching remote vehicle. In this situation, determining that the potential message occlusion exists can include identifying a remote vehicle that is approaching the host vehicle based on a plurality of messages received from the remote vehicle, and determining that receipt of messages from the remote vehicle has ceased. A remote vehicle is considered to be approaching the host vehicle while it is moving toward a point of convergence as determined using the previously discussed converging path principles. The cessation of messages from the remote vehicle while it is moving toward the point of convergences indicates that an occlusion is present between the remote vehicle and the host vehicle.

In some implementations, determining that a potential message occlusion exists and/or verifying existence of the potential message occlusion is performed based on messages received from a first remote vehicle that identify the presence of one or more additional remote vehicles. For example, in the scenario 14000 of FIG. 14, the first remote vehicle RV1 and the second remote vehicle RV2 are occluding messages broadcast by the third remote vehicle RV3 and the fifth remote vehicle RV5. Thus, the host vehicle HV has not received messages from the third remote vehicle RV3 or from the fifth remote vehicle RV5. The host vehicle is, however, receiving messages from the first remote vehicle RV1, the second remote vehicle RV2, and the fourth remote vehicle RV4. In this example, the messages received by the host vehicle from one or more of the remote vehicles include information that identifies the presence of other remote vehicles. For example, the message received by the host vehicle HV from the fourth remote vehicle RV4 can include a list of all of the vehicles that the fourth remote vehicle RV4 has recently received a message from.

In this example, the list of vehicles transmitted by the fourth remote vehicle would include information identifying each of the host vehicle HV, the first remote vehicle RV1, the second remote vehicle RV2, the third remote vehicle RV3, and the fifth remote vehicle RV5. The host vehicle HV determines that there is a message occlusion because it has not received messages from the third remote vehicle RV3 and the fifth remote vehicle RV5, which are on the list of vehicles. Thus, determining that a potential message occlusion exists can include receiving, at the host vehicle from a first remote vehicle, information identifying presence of a second remote vehicle, and determining that no messages have been received from the second remote vehicle. In an alternative implementation, the information identifying the presence of remote vehicles is received from a stationary transmitter via vehicle-to-infrastructure communication. In this implementation determining that a potential message occlusion exists includes receiving, at the host vehicle from a stationary transmitter, information identifying presence of a second remote vehicle, and determining that no messages have been received from the second remote vehicle.

In some implementations, determining that a potential message occlusion exists and/or verifying existence of the potential message occlusion is performed based on messages received at the host vehicle, or from messages received from a stationary transmitter. Therefore, determining that a potential message occlusion exists can include receiving, at the host vehicle from a stationary transmitter, a message indicating that a potential message occlusion exists. This can be the case when a stationary transmitter is installed at the site of a fixed object that is known to be a message occlusion, such as a building. The stationary transmitter can broadcast messages that include information that describes the location of the potential message occlusion.

In some implementations, determining that a potential message occlusion exists and/or verifying existence of the potential message occlusion is performed using sensors, such as the sensor 1360 of the controller 1300 of the vehicle 100. Thus, determining that the potential message occlusion exists can include receiving, from one or more sensors associated with the host vehicle, information that identifies an obstacle in a vicinity of the host vehicle. The obstacle can be, as examples, a large vehicle or a fixed object such as a building that is situated near the roadway that the vehicle is travelling on.

In some implementations, the message occlusion alert is output in a manner that indicates the positional relationship of the occlusion with respect to the host vehicle. The positional relationship of the host vehicle HV with respect to the subject remote vehicle can be determined as explained with respect to Equation 1 and Equation 2. Then, the occlusion warning can be output in a manner that is dependent upon the convergence angle $\beta_1$. In one example, the occlusion warning can include a visual indicator that visually shows the occlusion angle relative to the host vehicle HV, such as by superimposing an arrow oriented at the direction of the convergence angle $\beta_1$ displayed with a graphic representing the host vehicle HV. Another visual indicator could indicate a region, such as a quadrant, in which the occlusion lies relative to a graphic representing the host vehicle HV. In another example, the occlusion alert specifies whether the occlusion is located on the left or right side of the host vehicle HV by indicators presented in a graphical display or by indicators positioned on the left and right side of the vehicle, such as on the driver and passenger side rear view mirrors of the vehicle.

In some implementations, the message occlusion alert includes information that is representative of or based on the size and/or shape of the occlusion. For example, an angle or angular range of corresponding to the occlusion can be determined based on the size of the occluding object. Size can be determined from information contained in the remote vehicle information if the occlusion is a remote vehicle, in which case the information can describe vehicle size. As another example, size can by determined from information in the message received from a stationary transmitter if the occlusion is a building or other fixed object, in which case the information can describe the size or extents of the building or other fixed object. The occlusion alert can also include information regarding the shape of the occluding object in a position relative to the host vehicle, such as on a graphical display. For example, an indicator on a graphical display can include a sector centered at a representation of the host vehicle, and having an angle representative of the angle or angular range occluded by the occluding object. In these examples the angle or angular range of occlusion can be determined by the size of the occluding object and its proximity to the host vehicle HV, as well as by the shape of the occluding object, if shape information is available. The angle of the displayed sector can be any angle between 0 and 360 degrees.

In an example where the occlusion alert specifies whether the occlusion is located on the left or right side of the host vehicle HV, the vehicle warning system can determine the side on which the vehicle is located using the positional relationship between the host vehicle HV and the subject remote vehicle by comparing the convergence angle $\beta_1$ (in radians) to $\pi$. If $\beta_1 > 0$ and $\beta_1 < \pi$, the subject remote vehicle is to the left of the host vehicle, and the message occlusion alert can be output in a manner that indicates that the subject remote vehicle is to the left of the host vehicle. If $\beta_1 > \pi$, and $\beta_1 < 2\pi$ the subject remote vehicle is to the right of the host vehicle, and the message occlusion alert can be output in a manner that indicates that the subject remote vehicle is to the right of the host vehicle. Therefore, causing the message occlusion alert to be output can include identifying a positional relationship of the potential message occlusion with respect to the host vehicle, wherein causing a message occlusion alert to be output is performed in a manner that identifies the positional relationship of the potential message occlusion with respect to the host vehicle.

Figure 17:
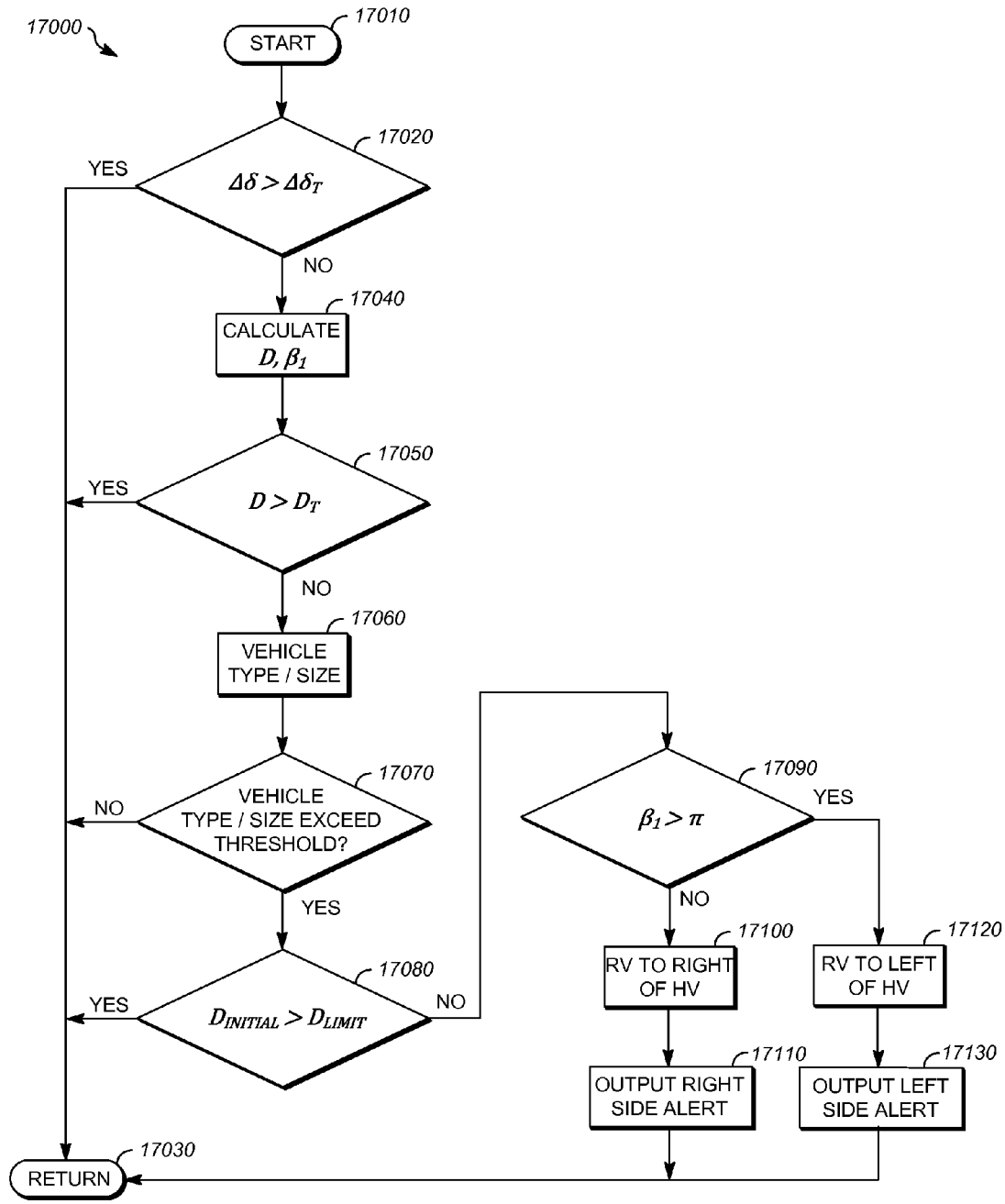
FIG. 17 is a flowchart that shows a message occlusion detection method according to a second example.

FIG. 17 is a flowchart that shows a message occlusion detection method 17000 according to a second example in which message occlusion detection strategies discussed above are combined in order to determine that a potential message occlusion exists and then verify existence of the message occlusion. The message occlusion detection method 17000 can be implemented in a vehicle, such as the vehicle 1000 shown in FIG. 1 or the vehicles 2100/2110 shown in FIG. 2, in order to provide information to the driver of the vehicle regarding a potential message occlusion. As an example, the method can be performed by the controller 1300 of the vehicle 1000 by storing instructions at the memory 1340 that, when executed by the processor 1330 cause the message occlusion detection method 17000 to be performed including causing output of a message occlusion alert by the user interface 1350. The method 17000 can be performed during operation of the vehicle in any situation, including in the scenario 14000 of FIG. 14 and the scenario 15000 of FIG. 15.

Initially, the host vehicle HV receives messages, such as basic safety messages, from the remote vehicles that are in the vicinity of the host vehicle. Next, the host vehicle HV locates all of the approaching remote vehicles that are within the vicinity of the host vehicle HV using the remote vehicle information, including geospatial information and the kinematic information, that was received from the remote vehicles. The method 17000 can then be applied, starting at start block 17010, to each of the approaching remote vehicles that are within the vicinity of the host vehicle HV in turn.

In operation 17020 the heading angles of the host vehicle HV and the subject remote vehicle are compared. In particular, the host vehicle HV can determine whether a difference $\Delta\delta$ between the host vehicle heading angle $\delta_{HV}$ and the remote vehicle heading angle $\delta_{RV}$ is less than a threshold $\Delta\delta_T$. Further analysis is not performed if the heading angles differ by more than the threshold $\Delta\delta_T$, and the process instead proceeds to a return block 17030. If the heading angles do not differ by more than the threshold $\Delta\delta_T$, the process proceeds to operation 17040.

In operation 17040, the distance D the convergence angle $\beta_1$ between the host vehicle HV and the subject remote vehicle are calculated. These values are calculated using remote vehicle information such as geospatial state information in the manner described previously in connection with Equation 1 and Equation 2.

In operation 17050, the distance D is compared to the message occlusion threshold distance $D_T$. If the distance D is greater than the message occlusion threshold distance $D_T$, the process proceeds to the return block 17030. If the distance D is less than the message occlusion threshold distance $D_T$, the process proceeds to operation 17060.

In operation 17070, the vehicle type and/or size are determined. The vehicle type and/or size can be identified based on the remote vehicle information, such as in the form of explicit values contained in the remote vehicle information, as previously explained. In operation 17070, the vehicle type and/or size are compared to a threshold. The process proceeds to the return block 17030 and no further analysis is performed if the vehicle type and/or size are less than the threshold. The process proceeds to the operation 17080 if the vehicle type and/or size are greater than the threshold.

Operations 17020 through 17070 have identified that a potential message occlusion exists. In operation 17080, and additional message occlusion detection strategy is utilized to verify the existence of the potential message occlusion. If both strategies indicate that a potential message occlusion exists, it is considered verified. In the current example, operation 17080 determines whether messages are being received from any other remote vehicle in the vicinity of the host vehicle HV in a manner that suggests a message occlusion. The initial message distance $D_{initial}$ at which a first message from a remote vehicle is received is determined, and is compared to a limit distance $D_{Limit}$ that is lower than the broadcast range of the vehicles. If the initial message distance $D_{initial}$ is greater than the limit distance $D_{Limit}$, this indicates that messages are first received from approaching vehicles when they are sufficiently far away from the host vehicle HV to indicate that no message occlusion is present, and the process proceeds to the return block 17030. If the initial message distance $D_{initial}$ is less than the limit distance $D_{Limit}$, this indicates that messages are first received from approaching vehicles when close to the host vehicle HV, which implies that a message occlusion is present, and the process proceeds to the operation 17090.

In one example, the vehicle warning system identifies messages that are first received at a distance that is much closer than the typical broadcast range of the wireless communications systems used by the vehicles. For example, if the broadcast range is 300 meters and messages are first received from a remote vehicle (i.e. no prior messages have been received from the remote vehicle) at an initial message distance of 50 meters that is less than a threshold such as a limit distance $D_{Limit}$ of 70 meters, the vehicle warning system can determine that a potential message occlusion exists. Thus, determining that the potential message occlusion exists can include receiving an initial message from the remote vehicle when no prior messages have been received at the host vehicle from the remote vehicle; determining an initial message distance at which the initial message is received; and determining that the initial message distance is less than a limit distance. In this example the initial message distance is the distance of the remote vehicle from the host vehicle can be determined using the remote vehicle information contained in the message in conjunction with the host vehicle information, as explained with respect to Equation 2.

In operation 17090, the convergence angle $\beta_1$ is utilized to determine where the subject remote vehicle is positioned relative to the host vehicle HV. If $\beta_1$ is greater than 0 and less than $\pi$, the subject remote vehicle is determined to be to the right of the host vehicle HV at operation 17100. In response to determining that the subject remote vehicle is to the right of the host vehicle HV, a message occlusion alert indicating that the subject remote vehicle is to the right of the host vehicle is output at operation 17110. If $\beta_1$ is greater than $\pi$ and less than $2\pi$, the subject remote vehicle is determined to be to the left of the host vehicle HV at operation 17120. In response to determining that the subject remote vehicle is to the left of the host vehicle HV, a message occlusion alert indicating that the subject remote vehicle is to the left of the host vehicle is output at operation 17130. Subsequent to either of operation 17110 or 17130, the process proceeds to the return block.

At the return block 17130, the process can return to the start block 17010. Subsequent iterations of the process 17000 can analyze different remote vehicles or can analyze the same remote vehicle using different data, such as a subsequently received message including updated remote vehicle information.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for providing information to a driver of a vehicle, comprising:
   receiving, at a host vehicle via a wireless electronic communication link, messages that each include remote vehicle information for a respective one of the one or more remote vehicles;
   identifying host vehicle information for the host vehicle;
   determining that a potential message occlusion exists in response to receiving a transmission from a first remote vehicle from the one or more remote vehicles that indicates that a vehicle size of the first remote vehicle is greater than a threshold size and a distance of the first vehicle from the host vehicle is less than a message occlusion threshold distance, wherein the potential message occlusion is indicative of an object that blocks line-of-sight dependent transmissions from reaching the host vehicle via the wireless electronic communication link; and in response to determining that a potential message occlusion exists, causing a message occlusion alert to be output.

2. The method of claim 1, wherein determining that the potential message occlusion exists includes:
verifying existence of the potential message occlusion based on messages received from a second remote vehicle of the one or more remote vehicles.

3. The method of claim 2, wherein verifying that the potential message occlusion exists includes:
receiving, at the host vehicle from a stationary transmitter, a message indicating that a potential message occlusion exists.

4. The method of claim 2, wherein verifying that the potential message occlusion exists includes:
receiving, at the host vehicle from a first remote vehicle of the one or more remote vehicles, an initial message including remote vehicle information for the first remote vehicle, wherein no prior messages have been received at the host vehicle from the first remote vehicle,
determining an initial message distance of the first remote vehicle from the host vehicle at which the initial message is received, and
determining that the initial message distance is less than a limit distance.

5. The method of claim 2, wherein verifying that the potential message occlusion exists includes:
receiving, at the host vehicle from a first remote vehicle of the one or more remote vehicles, information identifying presence of a second remote vehicle, and
determining that no messages have been received from the second remote vehicle.

6. The method of claim 2, wherein verifying that the potential message occlusion exists includes:
receiving, at the host vehicle from a stationary transmitter, information identifying presence of a second remote vehicle, and
determining that no messages have been received from the second remote vehicle.

7. The method of claim 2, wherein verifying that the potential message occlusion exists includes:
identifying a first remote vehicle that is approaching the host vehicle based on a plurality of messages received from the first remote vehicle, and
determining that receipt of messages from the first remote vehicle has ceased.

8. The method of claim 2, wherein verifying that the potential message occlusion exists includes:
receiving, from one or more sensors associated with the host vehicle, information that identifies an obstacle in a vicinity of the host vehicle.

9. The method of claim 1, further comprising:
identifying, based on the remote vehicle information, a positional relationship of the potential message occlusion with respect to the host vehicle, wherein causing a message occlusion alert to be output is performed in a manner that identifies the positional relationship of the potential message occlusion with respect to the host vehicle.

10. A vehicle, comprising:
a wireless electronic communication device;
one or more sensors;
an output system including at least one of an audio output device or a visual output device; and
an information system operable to execute instructions that cause the information system to:
receive, at a host vehicle via a wireless electronic communication link, messages that each include remote vehicle information for a respective one of the one or more remote vehicles,
identify host vehicle information for the host vehicle,
determine that a potential message occlusion exists in response to receiving a transmission from a first remote vehicle from the one or more remote vehicles that indicates that a vehicle size of the first remote vehicle is greater than a threshold size and a distance of the first vehicle from the host vehicle is less than a message occlusion threshold distance, wherein the potential message occlusion is indicative of an object that blocks line-of-sight dependent transmissions from reaching the host vehicle via the wireless electronic communication link, and
in response to determining that a potential message occlusion exists, cause a message occlusion alert to be output using the output system.

11. The vehicle of claim 10, wherein the information system determines that the potential message occlusion exists by executing instructions that cause the information system to:
verify existence of the potential message occlusion based on messages received from a second remote vehicle of the one or more remote vehicles.

12. The vehicle of claim 11, wherein the information system verifies that the potential message occlusion exists by executing instructions that cause the information system to:
receive, at the host vehicle from a stationary transmitter, a message indicating that a potential message occlusion exists.

13. The vehicle of claim 11, wherein the information system verifies that the potential message occlusion exists by executing instructions that cause the information system to:
receive, at the host vehicle from a first remote vehicle of the one or more remote vehicles, an initial message including remote vehicle information for the first remote vehicle, wherein no prior messages have been received at the host vehicle from the first remote vehicle,
determine an initial message distance of the first remote vehicle from the host vehicle at which the initial message is received, and
determine that the initial message distance is less than a limit distance.

14. The vehicle of claim 11, wherein the information system verifies that the potential message occlusion exists by executing instructions that cause the information system to:
receive, at the host vehicle from a first remote vehicle of the one or more remote vehicles, information identifying presence of a second remote vehicle, and
determine that no messages have been received from the second remote vehicle.

15. The vehicle of claim 11, wherein the information system verifies that the potential message occlusion exists by executing instructions that cause the information system to:

receive, at the host vehicle from a stationary transmitter, information identifying presence of a second remote vehicle, and determine that no messages have been received from the second remote vehicle.

16. The vehicle of claim 11, wherein the information system verifies that the potential message occlusion exists by executing instructions that cause the information system to:

identify a first remote vehicle that is approaching the host vehicle based on a plurality of messages received from the first remote vehicle, and determine that receipt of messages from the first remote vehicle has ceased.

17. The vehicle of claim 10, wherein the information system determines that the potential message occlusion exists by executing instrucions that cause the information system to:

receive, from one or more sensors associated with the host vehicle, information that identifies an obstacle in a vicinity of the host vehicle.

18. The vehicle of claim 10, wherein the instructions further cause the information system to:

identify, based on the remote vehicle information, a positional relationship of the potential message occlusion with respect to the host vehicle, wherein the instructions cause the message occlusion alert to be output is performed in a manner that identifies the positional relationship of the potential message occlusion with respect to the host vehicle.

* * * * *